United States Patent
Liu et al.

(10) Patent No.: US 12,456,913 B2
(45) Date of Patent: Oct. 28, 2025

(54) RESONANT SWITCHED CAPACITOR VOLTAGE CONVERTER AND CONTROL METHOD THEREOF

(71) Applicant: Richtek Technology Corporation, Zhubei (TW)

(72) Inventors: Kuo-Chi Liu, Hsinchu (TW); Ta-Yung Yang, Taoyuan (TW); Wei-Hsu Chang, Hsinchu (TW); Chao-Chi Chen, New Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 329 days.

(21) Appl. No.: 18/449,182

(22) Filed: Aug. 14, 2023

(65) Prior Publication Data

US 2024/0072633 A1  Feb. 29, 2024

Related U.S. Application Data

(60) Provisional application No. 63/374,141, filed on Aug. 31, 2022.

(30) Foreign Application Priority Data

Jan. 11, 2023 (TW) .................. 112101231

(51) Int. Cl.
*H02M 3/07* (2006.01)
*H02M 1/00* (2006.01)

(52) U.S. Cl.
CPC ....... *H02M 1/0058* (2021.05); *H02M 1/0009* (2021.05); *H02M 3/07* (2013.01)

(58) Field of Classification Search
CPC ........ H02M 3/07; H02M 3/071; H02M 3/072; H02M 3/073; H02M 3/075; H02M 3/06; H02M 1/0058; H02M 1/0067; H02M 1/007; H02M 1/0074; H02M 1/008; H02M 1/0083; H02M 1/0043; H02M 1/0009

See application file for complete search history.

(56) References Cited

U.S. PATENT DOCUMENTS

| 9,793,804 B2 | 10/2017 | Zhang et al. | |
| 2019/0356149 A1* | 11/2019 | Li | H02M 3/33576 |
| 2022/0060100 A1* | 2/2022 | Huang | H02M 3/158 |
| 2024/0146180 A1* | 5/2024 | Huang | H02M 3/158 |

* cited by examiner

*Primary Examiner* — Nguyen Tran
(74) *Attorney, Agent, or Firm* — Tung & Associates

(57) ABSTRACT

The present invention provides a resonant switched capacitor voltage converter (RSCC), which is coupled to and operates synchronously with another RSCC. The RSCC includes: plural switches, a resonant inductor, a resonant capacitor, and a control circuit. The control circuit controls the switches, so that the resonant capacitor and the resonant inductor are connected in series to each other, to perform resonant operation in a switching period, thus converting an input voltage to an output voltage. The control circuit generates a zero current signal and a first synchronization signal when a resonant inductor current flowing through the resonant inductor is zero. The control circuit turns off at least one corresponding switch according to the zero current signal. The control circuit turns on at least one corresponding switch according to the zero-current signal and a second synchronization signal, so that the RSCC operates in synchronization with at least another RSCC.

20 Claims, 17 Drawing Sheets

RESONANT SWITCHED CAPACITOR VOLTAGE CONVERTER AND CONTROL METHOD THEREOF

CROSS REFERENCE

The present invention claims priority to U.S. 63/374,141 filed on Aug. 31, 2022 and claims priority to TW 112101231 filed on Jan. 11, 2023.

BACKGROUND OF THE INVENTION

Field of Invention

The present invention relates to a resonant switched capacitor voltage converter (RSCC) and a control method of the RSCC; particularly, it relates to such RSCC which can be coupled to at least another RSCC and cooperate with the at least another RSCC in synchronization, and a control method thereof.

Description of Related Art

In a conventional multi-power converter system, several power converters are coupled in parallel, so as to provide a relatively higher power to a load, as compared to a single power converter. In such conventional multi-power converter system, it is required to designate a master power converter and to designate the rest power converts to be slave power converters. Besides, In such conventional multi-power converter system, it is required to manage phase-shift degrees, synchronization signal, current sharing and switching frequency.

In addition, U.S. Pat. No. 9,793,804 B2 discloses a circuit and a method for controlling a three-level buck converter, wherein two three-level buck converters are coupled to each other and are operated according to four clock signals. In this prior art, the clock signals are shifted 90° relative to one another.

The aforementioned prior arts have the following drawbacks. First, it is required for these prior arts to designate a master power converter and slave power converters and to set and manage many parameters, which are inconvenient. Besides, these prior arts have lower power conversion efficiencies, higher switching losses and more severe electromagnetic interference (EMI); and the control mechanism for synchronization operation and current balancing of these prior arts are complicated.

In view of the above, to overcome the drawbacks in the prior art, the present invention proposes an innovative RSCC and a control method of such innovative RSCC, which do not require designating master and slave power converters and setting and managing complicated parameters. The present invention has a higher power conversion efficiency, lower switching loss and lower EMI, and the control mechanisms for synchronization operation and current balancing in the present invention are much simpler.

SUMMARY OF THE INVENTION

From one perspective, the present invention provides a resonant switched capacitor voltage converter (first RSCC), which is configured to be coupled to at least another RSCC (second RSCC) and operate in synchronization with the second RSCC, to convert an input voltage to an output voltage; the first RSCC comprising: a plurality of switches, which constitute a switching circuit, wherein the switching circuit is configured to operably receive the input voltage; a resonant inductor, which is coupled to the switching circuit; a resonant capacitor, which is coupled to the switching circuit; and a control circuit, which is configured to operably generate a plurality of switching signals, to correspondingly control the plurality of switches in the switching circuit, so that the resonant capacitor and the resonant inductor are connected in series to each other, to perform resonant operation during a switching period, thus converting the input voltage to the output voltage; wherein the control circuit is configured to operably generate a zero current signal and a first synchronization signal when a resonant inductor current flowing through the resonant inductor is zero; wherein the control circuit is configured to operably turn off at least one corresponding switch according to the zero current signal; wherein the first synchronization signal is configured to be inputted into the second RSCC; wherein the control circuit is configured to operably turn on the at least one corresponding switch according to the zero current signal and a second synchronization signal, so that the first RSCC operates in synchronization with the second RSCC.

In one embodiment, the control circuit is configured to operably generate the first synchronization signal according to the zero current signal during the switching period or a half switching period, so that the first RSCC operates in synchronization with the second RSCC.

In one embodiment, the second synchronization signal is generated by the second RSCC, so that the second RSCC operates in synchronization with the first RSCC.

In one embodiment, the second RSCC operates in synchronization with the first RSCC with a 180-degree phase-shift according to the first synchronization signal and the second synchronization signal.

In one embodiment, the control circuit is configured to operably turn on the at least one corresponding switch according to the zero current signal and the second synchronization signal which is generated by the second RSCC, so that the first RSCC operates in synchronization with the second RSCC with a predetermined phase-shift.

In one embodiment, the control circuit is configured to operably generate the plurality of switching signals according to a resonant frequency of a resonant operation, wherein the control circuit decides a turned-off period of the corresponding switch according to the resonant frequency, so that the first RSCC operates in synchronization with the second RSCC.

In one embodiment, the control circuit is configured to operably generate the switching signal according to the zero current signal, so as to operate the at least one corresponding switch, thus achieving a zero current switching; wherein the control circuit is configured to operably generate the zero current signal according to a voltage across two ends of the resonant inductor or the resonant inductor current.

In one embodiment, the first RSCC is coupled in parallel to the second RSCC and the first RSCC operates in synchronization with the second RSCC to broaden an output current scope.

In one embodiment, the first RSCC is coupled in series to the second RSCC and the first RSCC operates in synchronization with the second RSCC, so as to increase a voltage conversion ratio scope.

In one embodiment, the RSCC includes one of following: a 2-to-1 RSCC, a series-parallel RSCC, a pipelined RSCC, a switched tank converter or a cross coupled switched-capacitor converter.

From another perspective, the present invention provides a control method of a resonant switched capacitor voltage converter (first RSCC), wherein the first RSCC is configured to be coupled to at least another RSCC (second RSCC) and operate in synchronization with the second RSCC, to convert an input voltage to an output voltage; the control method of the first RSCC comprising following steps: generating a plurality of switching signals to operably control the plurality of switches, so that a resonant capacitor and a resonant inductor are connected in series to each other, to perform resonant operation during a switching period, thus converting the input voltage to the output voltage; generating a zero current signal and a first synchronization signal when a resonant inductor current flowing through the resonant inductor is zero; turning off at least one corresponding switch according to the zero current signal; and turning on the at least one corresponding switch according to the zero current signal and a second synchronization signal, so that the first RSCC operates in synchronization with the second RSCC; wherein the first synchronization signal is configured to be inputted into the second RSCC.

Advantages of the present invention include: that plural RSCCs can operate in synchronization in shifted alternating phases; that the present invention can provide a resonant operation having high efficiency and high power density; that because the zero current soft switching is achieved, the switching power loss in the present invention is lower; that it is not required for the present invention to designate master and slave power converters; that the present invention can compensate device errors by automatic synchronizing signals; that the present invention can manage to achieve synchronization operation of converters which have resonant loops that do not match with one another; that the present invention can improve the current balancing between two RSCCs which are coupled in parallel to each other; that the present invention can mitigate the impact of an input peak current on the input capacitor and the input power; and that the present invention can improve EMI performance.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
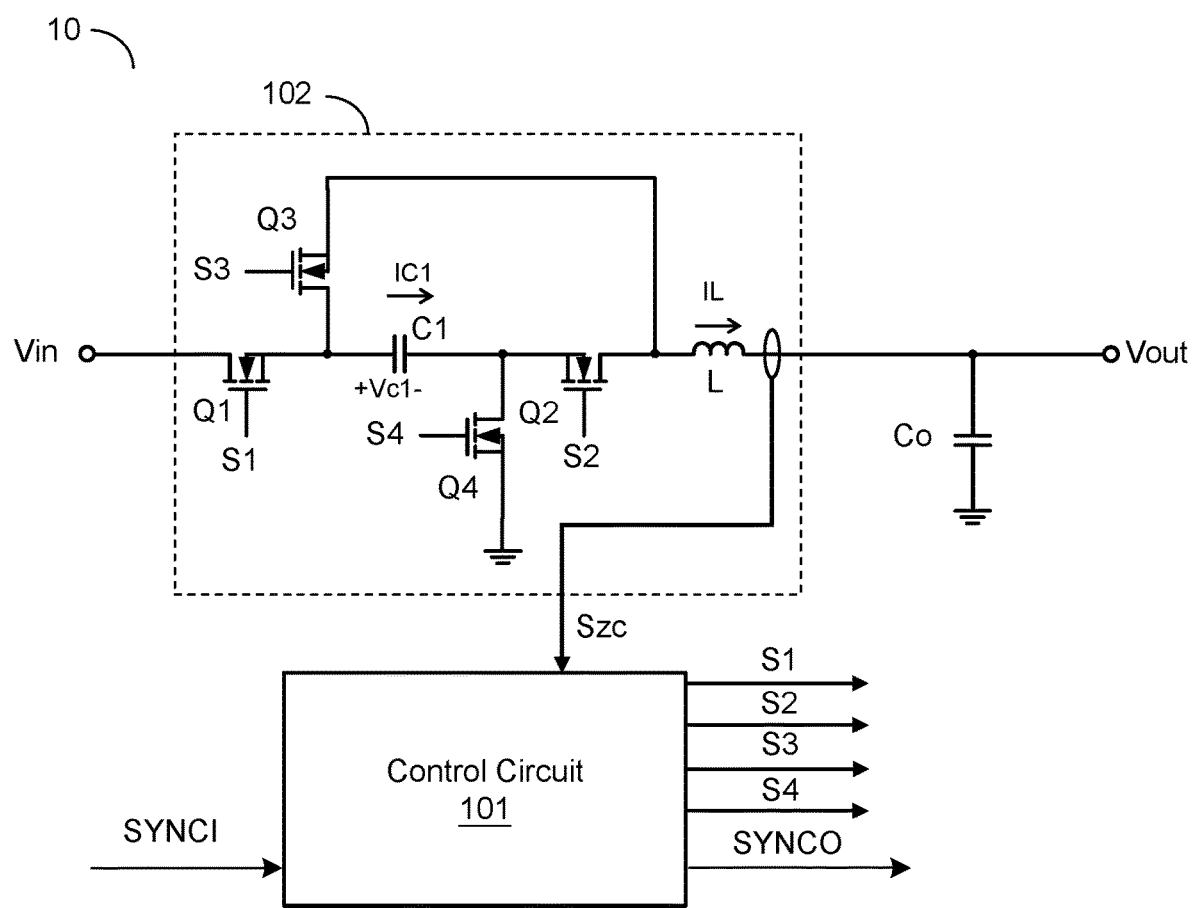
FIG. 1 shows a schematic circuit diagram of a resonant switched capacitor voltage converter (RSCC) according to an embodiment of the present invention.

FIG. 1 shows a schematic circuit diagram of a resonant switched capacitor voltage converter (RSCC) according to an embodiment of the present invention. The resonant switched capacitor voltage converter (RSCC) 10 shown in FIG. 1 can be coupled to at least another RSCC and the RSCCs can cooperate in synchronization operation to convert an input voltage Vin to an output voltage Vout. The RSCC 10 includes: a control circuit 101 and a power stage circuit 102. An output capacitor Co is configured to operably generate the output voltage Vout. The power stage circuit 102 is coupled between the input voltage Vin and the output voltage Vout. The power stage circuit 102 includes: a switch Q1, a switch Q2, a switch Q3, a switch Q4, a resonant inductor L and a resonant capacitor C1. The switch Q1, the switch Q2, the switch Q3 and the switch Q4 together constitute a switching circuit. The switch Q1 is coupled to the input voltage Vin and is configured to operably receive the input voltage Vin.

The resonant inductor L is coupled between the switching circuit and the output capacitor Co. The resonant capacitor C1 is coupled to the switching circuit. The control circuit 101 is configured to operably generate at least one switching signal according to the output voltage Vout (the details as to how the control circuit 101 generates the at least one switching signal according to the output voltage Vout will be described in detail later). The control circuit 101 is configured to operably generate switching signals S1-S4, for controlling the switches Q1-Q4 in the switching circuit correspondingly, so that the resonant capacitor C1 and the resonant inductor L are connected in series to each other to perform resonant operate during a switching period, thus converting the input voltage Vin to the output voltage Vout.

The control circuit 101 is configured to operably generate a zero current signal Szc and a first synchronization signal SYNCO when a resonant inductor current IL flowing through the resonant inductor L is zero or when a resonant capacitor current IC1 flowing through the resonant capacitor C1 is zero. The control circuit 101 is configured to operably turn off at least one corresponding switch of the switch Q1, the switch Q2, the switch Q3 and the switch Q4 according to the zero current signal Szc. The first synchronization signal SYNCO is transmitted to another RSCC. The control circuit 101 is configured to operably turn on the at least one corresponding switch in the switch Q1, the switch Q2, the switch Q3 and the switch Q4 according to the zero current signal Szc and a second synchronization signal SYNCI, so that the RSCC 10 operates in synchronization with the at least another RSCC. The second synchronization signal SYNCI is generated by the another RSCC when a resonant capacitor current IC1 flowing through the resonant capacitor C1 of the another RSCC is zero; that is, in one perspective, the second synchronization signal SYNCI generated by the another RSCC is the first synchronization signal of that another RSCC.

Figure 2:
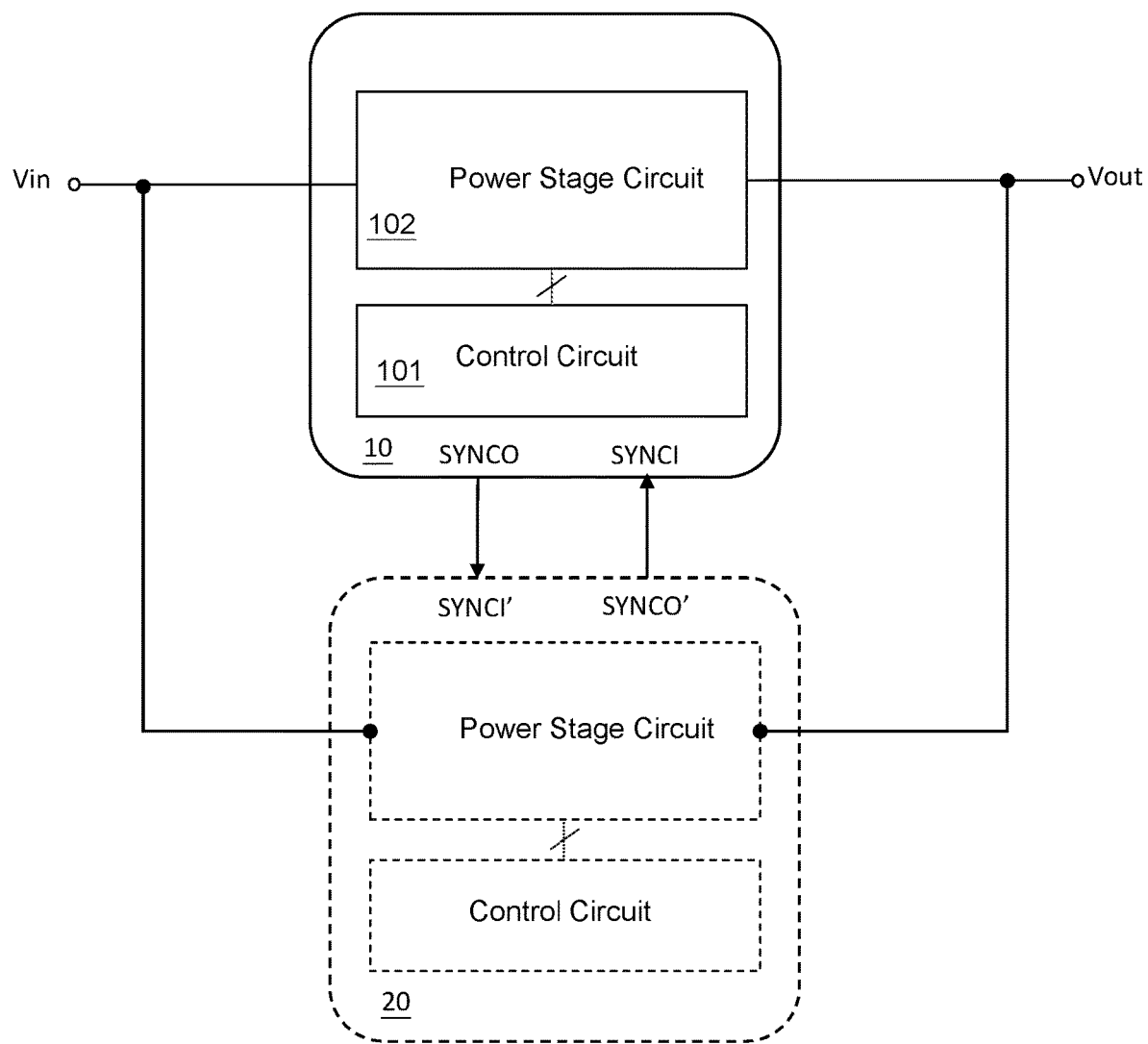
FIG. 2 shows a schematic block diagram of an RSCC according to an embodiment of the present invention.

FIG. 2 shows a schematic block diagram of an RSCC according to an embodiment of the present invention. The RSCC 10 includes: a control circuit 101 and a power stage circuit 102. The control circuit 101 is configured to operably control the switches in the power stage circuit 102, to convert an input voltage Vin to an output voltage Vout. Besides, the control circuit 101 is configured to operably generate a first synchronization signal SYNCO and receive a second synchronization signal SYNCI, so that the RSCC 10 can operate in synchronization with another RSCC (i.e., RSCC 20). In this embodiment, the first synchronization signal SYNCO generated by the RSCC 10 is the second synchronization signal SYNCI' generated by the RSCC 20, and the second synchronization signal SYNCI received by the RSCC 10 is the first synchronization signal SYNCO' generated by the RSCC 20.

In the embodiment shown in FIG. 2, the RSCC 10 is coupled in parallel to the another RSCC 20, to convert the input voltage Vin to the output voltage Vout. The control circuit 101 generates switching signals to control the operations of the switches, so as to control the power stage circuit 102 to perform resonant operation, and the switching signals control the switches in the power stage circuit 102 to switch at a time point when a resonant inductor current is zero. The RSCC 10 operates in synchronization with the another RSCC (i.e., RSCC 20) according to the first synchronization signal SYNCO and the second synchronization signal SYNCI.

The RSCC 10 and the RSCC 20 which operate synchronously with each other have merits of enhancing power delivery capability, reducing unwanted subharmonic phenomenon, output current sharing and improving EMI performance. Because the resonant frequency of the RSCC 10 and the resonant frequency of the RSCC 20 could be different from each other due to manufacture deviations of devices or unmatched circuit board layouts, a synchronization control method is required to ensure the RSCC 10 and the another RSCC 20 to operate in synchronization.

Figure 3:
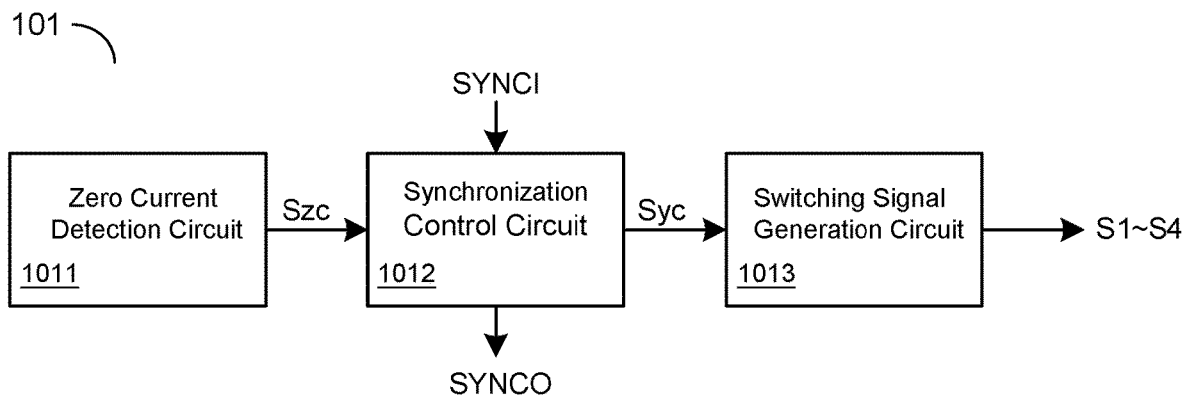
FIG. 3 shows a schematic block diagram of a control circuit in an RSCC according to an embodiment of the present invention.

FIG. 3 shows a schematic block diagram of a control circuit in an RSCC according to an embodiment of the present invention. As shown in FIG. 3, the control circuit 101 includes: a zero current detection circuit 1011, a synchronization control circuit 1012 and a switching signal generation circuit 1013. The zero current detection circuit 1011 is configured to operably generate a zero current signal Szc when a resonant inductor current flowing through the resonant inductor is zero or when a resonant capacitor current flowing through the resonant capacitor is zero. The synchronization control circuit 1012 is configured to operably generate a synchronization control signal Syc according to the zero current signal Szc and the second synchronization signal SYNCI, wherein the first synchronization signal SYNCO is inputted into the another RSCC. The switching signal generation circuit 1013 is configured to operably generate the switching signals S1~S4, for correspondingly controlling the switches Q1~Q4 in the power stage circuit.

Figure 4:
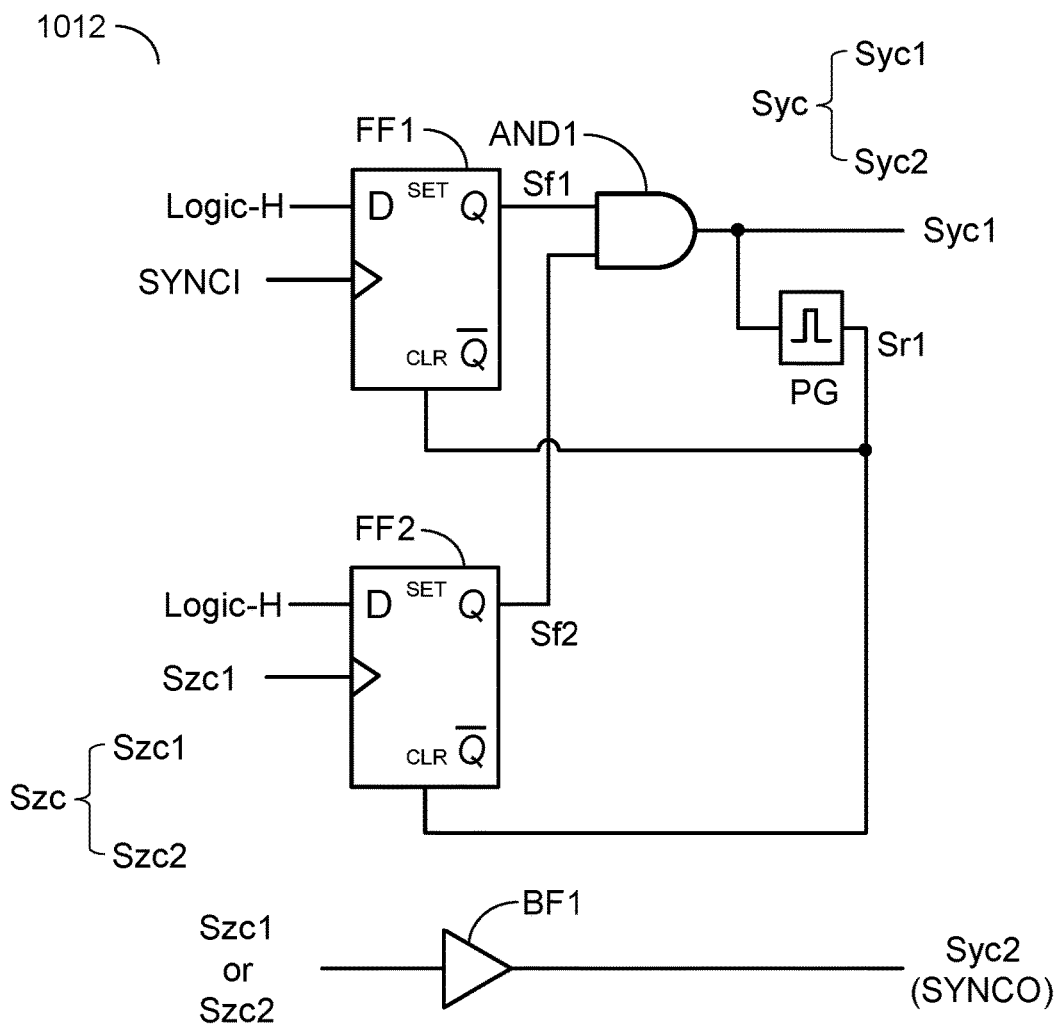
FIG. 4 shows a schematic diagram of a synchronization control circuit 1012 in an RSCC according to a specific embodiment of the present invention.
Figure 5:
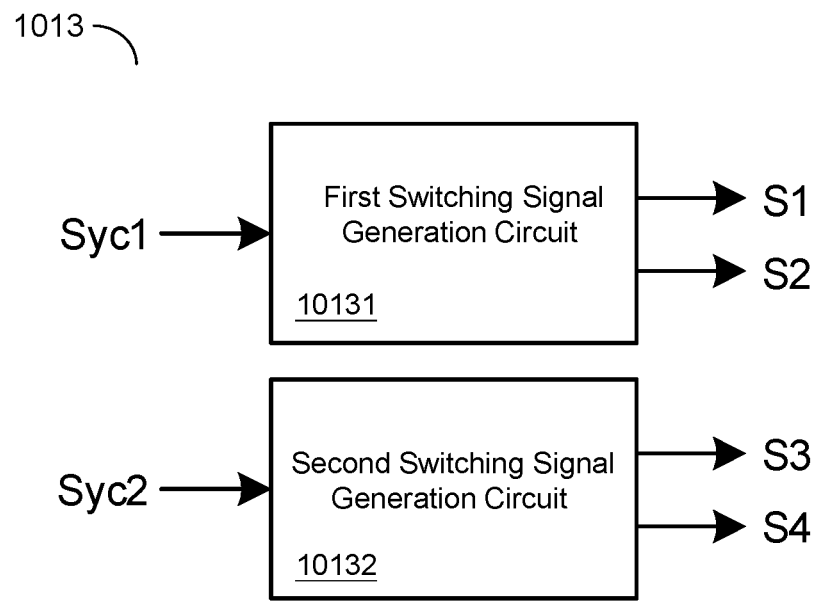
FIG. 5 shows a schematic block diagram of a switching signal generation circuit 1013 in an RSCC according to an embodiment of the present invention.

FIG. 4 shows a schematic diagram of the synchronization control circuit 1012 in an RSCC according to a specific embodiment of the present invention. Please refer to FIG. 4 along with FIG. 2, FIG. 3 and FIG. 5. A first flip-flop FF1 generates a first output signal Sf1 according to the second synchronization signal SYNCI. A second flip-flop FF2 generates a second output signal Sf2 according to a first zero current signal Szc1. A logic AND gate AND1 serves to execute AND operation on the first output signal Sf1 and the second output signal Sf2, to generate a first synchronization control signal Syc1, wherein the first synchronization control signal Syc1 serves to enable a first switching signal generation circuit 10131, so that the switching signal S1 and the switching signal S2 are generated by the first switching signal generation circuit 10131 (as shown in FIG. 5). Besides, a pulse generator PG delays and converts the first synchronization control signal Syc1, to generate a reset signal Sr1 having a pulse, so that the reset signal Sr1 resets the first flip-flop FF1 and the second flip-flop FF2 when the first synchronization control signal Syc1 is switched to high level. A logic high level signal Lgc-H is a signal which remains at high level, and the logic high level signal Lgc-H is inputted into an input pin D of the first flip-flop FF1 and an input pin D of the second flip-flop FF2.

A buffer BF1 generates a second synchronization control signal Syc2 based upon the first zero current signal Szc1 or a second zero current signal Szc2, wherein the second synchronization control signal Syc2 serves to enable a second switching signal generation circuit 10132, so that the switching signal S3 and the switching signal S4 are generated by the second switching signal generation circuit 10132 (as shown in FIG. 5). In this embodiment, the synchronization control signal Syc includes: the first synchronization control signal Syc1 and the second synchronization control signal Syc2. Besides, the zero current signal Szc includes: the first zero current signal Szc1 and the second zero current signal Szc2. The first zero current signal Szc1 indicates a time point at which the resonant capacitor current is zero before a switching period ends. That is, the first zero current signal Szc1 indicates a time point at which the resonant capacitor current is zero for a second time (i.e., a 360-degree phase) during the switching period. The second zero current signal Szc2 indicates a time point at which the resonant capacitor current is zero for a first time during the switching period, that is, at a 180-degree phase during the switching period.

The second synchronization control signal Syc2 can serve to function as a first synchronization signal SYNCO. In this embodiment, on one hand, when the second zero current signal Szc2 is selected to function as an input signal of the buffer BF1, the RSCC 10 and the RSCC 20 operate synchronously to each other with a 180-degree phase-shift. On the other hand, when the first zero current signal Szc1 is selected to function as the input signal of the buffer BF1, the RSCC 10 and the RSCC 20 operate synchronously to each other with a same phase. Whether to select the first zero current signal Szc1 or the second zero current signal Szc2 to function as the input signal of the buffer BF1 can be determined according to, for example, user's request.

FIG. 5 shows a schematic block diagram of a switching signal generation circuit 1013 in an RSCC according to an embodiment of the present invention. As shown in FIG. 5, the switching signal generation circuit 1013 includes: a first switching signal generation circuit 10131 and a second switching signal generation circuit 10132. The first switching signal generation circuit 10131 generates the switching signal S1 and the switching signal S2 in accordance with the first synchronization control signal Syc1. The second switching signal generation circuit 10132 generates the switching signal S3 and the switching signal S4 in accordance with the second synchronization control signal Syc2.

Figure 6:
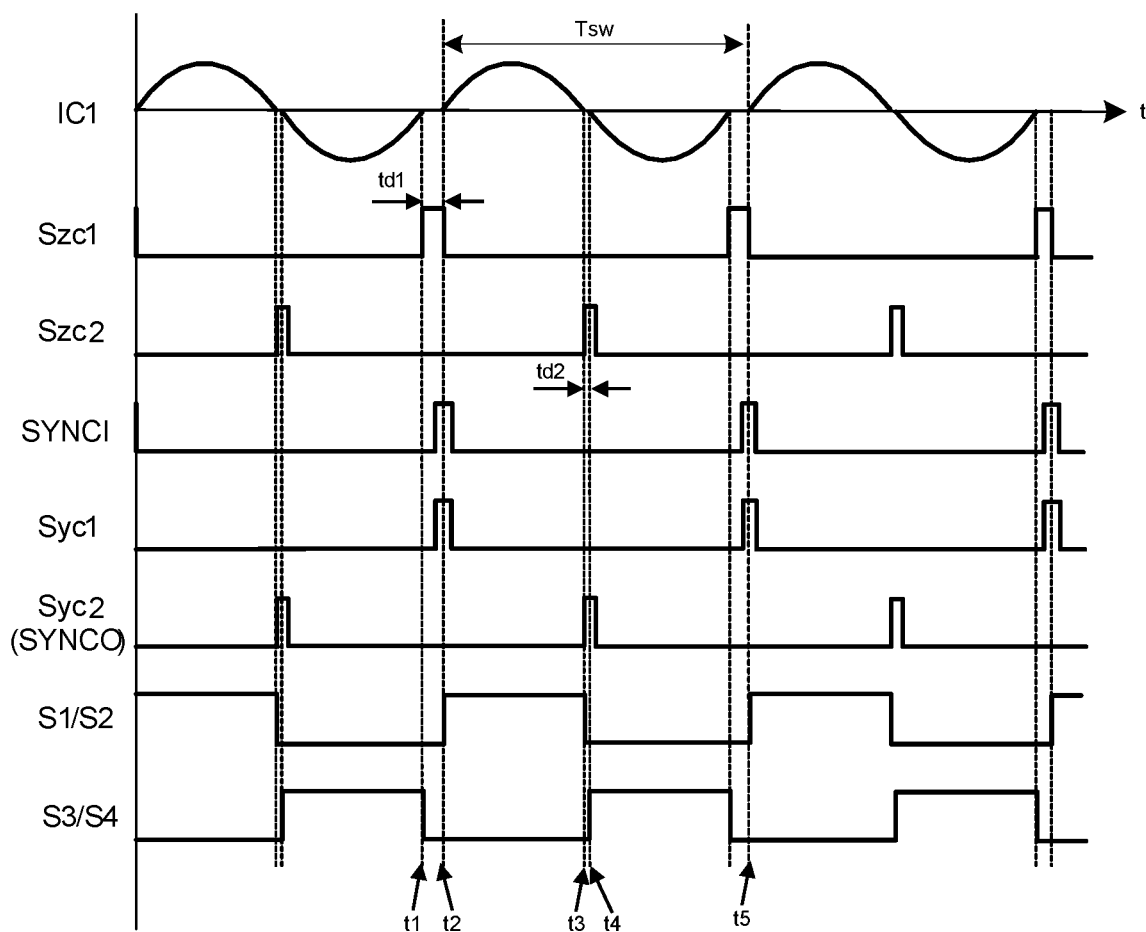
FIG. 6 illustrates a signal waveform diagram depicting a one-cycle synchronization control method configured to control the operations of the RSCC 10 and RSCC 20 with a 180-degree phase-shift synchronization operation according to an embodiment of the present invention.

FIG. 6 illustrates a signal waveform diagram depicting a one-cycle synchronization control method configured to control the operations of the RSCC 10 and RSCC 20 with a 180-degree phase-shift synchronization operation according to an embodiment of the present invention, wherein only the signals relevant to the operation of the RSCC 10 are illustrated. In this example, as compared to the another RSCC 20 which provides a second synchronization signal SYNCI, it is assumed that the RSCC 10 has a relatively higher resonant frequency. As a consequence, the rising edge of the first zero current signal Szc1 is earlier than the rising edge of the second synchronization signal SYNCI and the RSCC 10 and the RSCC 20 is synchronized to each other once for every switching period Tsw. It is worthwhile mentioning that in this embodiment, the RSCC 10 and the RSCC 20 operate synchronously to each other with a 180-degree phase-shift, which can be considered as that the RSCC 10 and the RSCC 20 operate synchronously to each other with an interleaved phase. To be more specific, that "the RSCC 10 and the RSCC 20 operate synchronously to each other with an interleaved phase", means: within a switching period Tsw, within a time duration from 0-degree phase to 180-degree phase, the RSCC 10 provides a current to the output end, whereas, within a time duration from the 180-degree phase to 360-degree phase, the RSCC 20 provides a current to the output end, so that the RSCC 10 and the RSCC 20 provide the currents to the output end in an alternating fashion.

More specifically, in the embodiment shown in FIG. 6, when the resonant capacitor current IC1 flowing through the resonant capacitor C1 is zero at the time point t1, the first zero current signal Szc1 is generated, and the control circuit 101 switches the switching signal S3 and the switching signal S4 from high level to low level according to the first zero current signal Szc1, so as to turn off the switch Q3 and the switch Q4. At the time point t1, a rising edge of the second synchronization signal SYNCI has not yet been generated, so the switch Q1, the switch Q2, the switch Q3 and the switch Q4 in the RSCC 10 are all in off state, waiting to operate in synchronization with the RSCC 20. There is a dead time period td1A from the rising edge of the first zero current signal Szc1 to a time point at which the switching signal S1 and the switching signal S2 are switched from low level to high level, which is the period from the time point t1 to the time point t2 in FIG. 6.

Within the period from the time point t1 to the time point t2, a rising edge of the second synchronization signal SYNCI from the RSCC 20 appears. Accordingly, the control circuit 101 generates the first synchronization control signal Syc1 according to the first zero current signal Szc1 and the second synchronization signal SYNCI, so as to switch the switching signal S1 and the switching signal S2 from low level to high level, thus turning on the switch Q1 and the switch Q2, so that the RSCC 10 operates in synchronization with the at least another RSCC 20.

When resonant capacitor current IC1 flowing through the resonant capacitor C1 is zero once again at the time point t3, the second zero current signal Szc2 is generated. Accordingly, the control circuit 101 switches the switching signal S1 and the switching signal S2 from high level to low level, so as to turn off the switch Q1 and the switch Q2. Besides, the control circuit 101 adopts the second zero current signal Szc2 to function as the first synchronization signal SYNCO, and inputs such first synchronization signal SYNCO into the at least another RSCC 20, so that the RSCC 10 and the at least another RSCC 20 operate synchronously to each other with a 180-degree phase-shift. At the time point t4 (which is the time point after a dead time period td2 from the appearance of the rising edge of the second zero current signal Szc2), the control circuit 101 switches the switching signal S3 and the switching signal S4 from low level to high level, so as to turn on the switch Q3 and the switch Q4.

When the resonant capacitor current IC1 flowing through the resonant capacitor C1 is zero once again, the aforementioned operations at the time point t1 is once again repeatedly executed. That is, at the time point t5, the switching signal S1 and the switching signal S2 are switched from low level to high level, to turn on the switch Q1 and the switch Q2. The period ranging from the time point t2 to the time point t5 in FIG. 6 is defined as a switching period Tsw. In this embodiment, when the RSCC 10 having a relatively higher resonant frequency as compared to the RSCC 20 has operated for a complete switching period Tsw, the RSCC 10 will wait for the RSCC 20 to reach its 180-degree phase (i.e., a half switching period) of the switching period of the RSCC 20, so that the RSCC 10 and the RSCC 20 operate in synchronization with a 180-degree phase-shift in one cycle.

Figure 7:
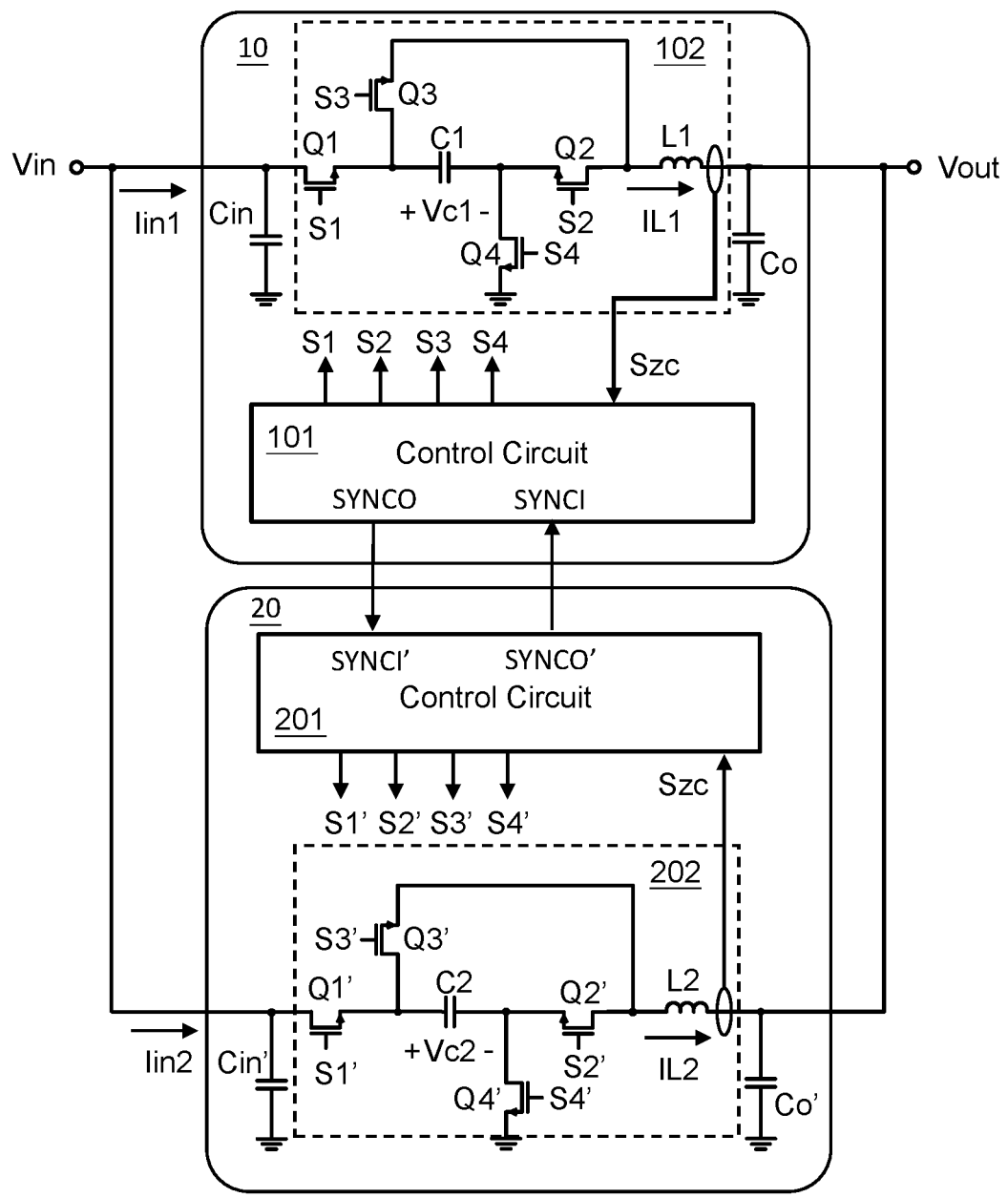
FIG. 7 shows a schematic circuit diagram showing that the RSCC is coupled to another RSCC and the two RSCCs cooperate in synchronization operation according to an embodiment of the present invention.

FIG. 7 shows a schematic circuit diagram depicting a situation wherein the RSCC 10 is coupled to the RSCC 20 and the RSCC 10 operates in synchronization with the RSCC 20 according to an embodiment of the present invention. As shown in FIG. 7, the RSCC 10 is coupled to the RSCC 20 and the RSCC 10 operates in synchronization with the RSCC 20, to convert an input voltage Vin to an output voltage Vout. The RSCC 10 includes: a control circuit 101 and a power stage circuit 102. An output capacitor Co is configured to operably generate the output voltage Vout. An input capacitor Ci is configured to operably stabilize the input voltage Vin. The power stage circuit 102 is coupled between the input voltage Vin and the output voltage Vout.

The power stage circuit 102 includes: a switch Q1, a switch Q2, a switch Q3, a switch Q4, a resonant inductor L1 and a resonant capacitor C1. The switch Q1, the switch Q2, the switch Q3 and the switch Q4 together constitute a switching circuit. The switch Q1 is coupled to the input voltage Vin and is configured to operably receive the input voltage Vin.

The RSCC 20 includes: a control circuit 201 and a power stage circuit 202. An output capacitor Co' is configured to operably generate the output voltage Vout. An input capacitor Ci' is configured to operably stabilize the input voltage Vin. The power stage circuit 202 is coupled between the input voltage Vin and the output voltage Vout. The power stage circuit 202 includes: a switch Q1', a switch Q2', a switch Q3', a switch Q4', a resonant inductor L2 and a resonant capacitor C2. The switch Q1', the switch Q2', the switch Q3' and the switch Q4' together constitute a switching circuit. The switch Q1' is coupled to the input voltage Vin and is configured to operably receive the input voltage Vin.

The current flowing through the resonant inductor L1 during the operation is the resonant inductor current IL1, whereas, the current flowing through the resonant inductor L2 during the operation is the resonant inductor current IL2. The voltage across two ends of the resonant capacitor C1 is the resonant capacitor voltage Vc1, whereas, the voltage across two ends of the resonant capacitor C2 is the resonant capacitor voltage Vc2. The current flowing through the power stage circuit 102 is the first input current Iin1, whereas, the current flowing through the power stage circuit 202 is the second input current Iin2. The circuit of this embodiment shown in FIG. 7 operates in the same way as the circuits of the embodiments shown in FIG. 1 and FIG. 2. For the details, please refer to the descriptions concerning the embodiments shown in FIG. 1 and FIG. 2 and the details thereof are not redundantly repeated here.

Figure 8:
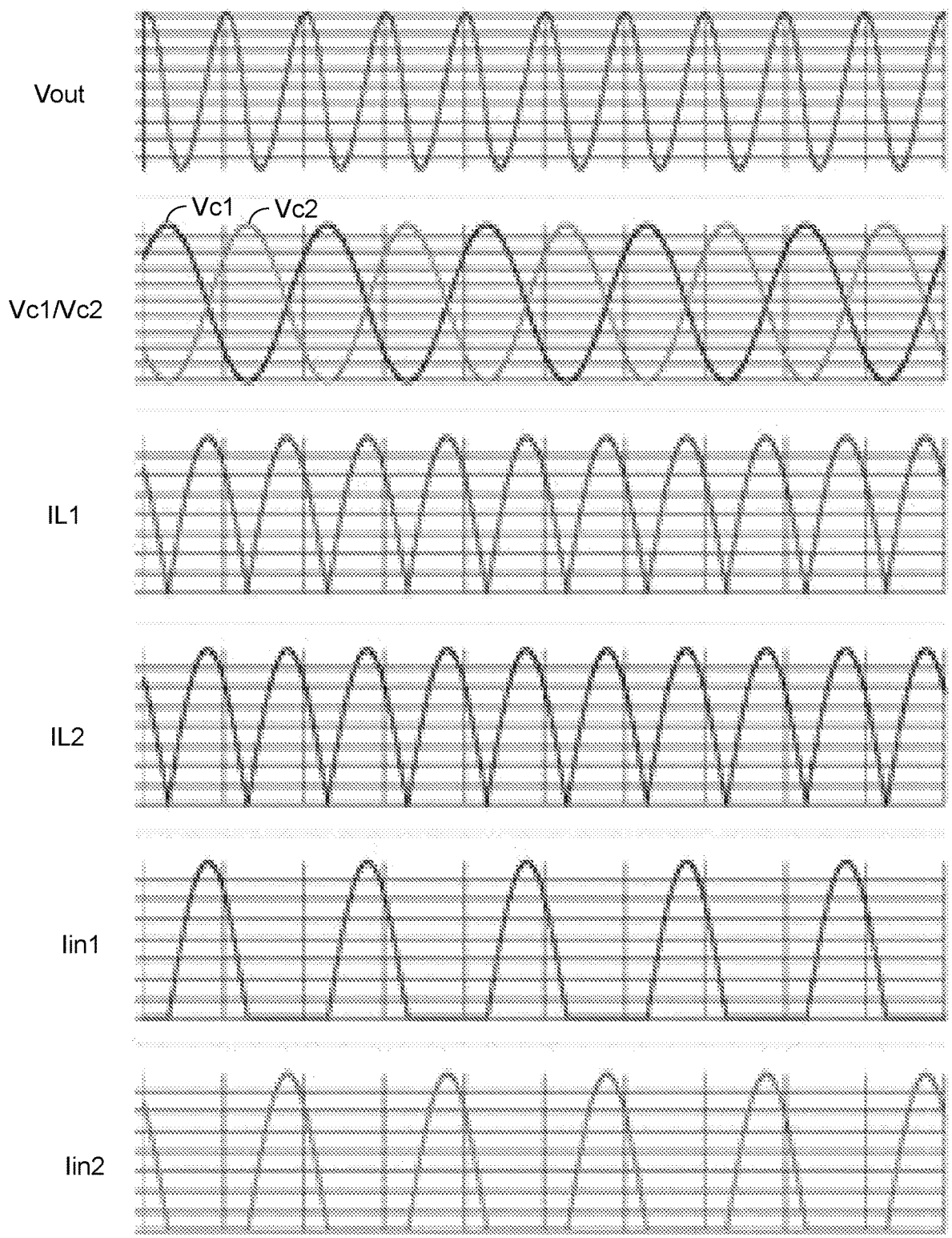
FIG. 8 illustrates a signal waveform diagram depicting a control method configured to control the operations of the RSCC 10 and RSCC 20 of FIG. 7 according to an embodiment of the present invention.

FIG. 8 illustrates a signal waveform diagram depicting a control method configured to control the operations of the RSCC 10 and RSCC 20 of FIG. 7 according to an embodiment of the present invention. Please refer to FIG. 8 along with FIG. 7 and FIG. 6. This embodiment illustrates a signal waveform diagram depicting a one-cycle synchronization control method configured to control the operations of the RSCC 10 and RSCC 20 with an interleaved phase operation according to an embodiment of the present invention. In this embodiment, the RSCC 10 and the RSCC 20 have for example a same resonant frequency. As a result, when the RSCC 10 and the RSCC 20 operate in synchronization, the amplitude of the resonant capacitor voltage Vc1 is the same as the amplitude of the resonant capacitor voltage Vc2, and the resonant capacitor voltage Vc1 and the resonant capacitor voltage Vc2 are phase-shifted by 180° from each other. It can be seen from the waveforms of the first input current Iin1 and the second input current Iin2 that the first input current Iin1 and the second input current Iin2 are phase-shifted by 180° from each other, to provide currents in an alternating fashion. During the resonant operation of the RSCC 10, due to the operations of the switch Q1, the switch Q2, the switch Q3 and the switch Q4 in the switching circuit in a charging process and a discharging process on the resonant capacitor C1, the waveform of the resonant inductor current IL1 is a full-wave rectified sinusoidal waveform. Similarly, during the resonant operation of the RSCC 20, due to the operations of the switch Q1', the switch Q2', the switch Q3' and the switch Q4' in the switching circuit in a charging process and a discharging process on the resonant capacitor C2, the waveform of the resonant inductor current IL2 is a full-wave rectified sinusoidal waveform. Each of the resonant inductor current IL1 and the resonant inductor current IL2 has a frequency which is 2-fold of a switching frequency corresponding to the switching period Tsw. As a consequence, the output voltage Vout has a frequency which is 2-fold of the switching frequency.

Figure 9:
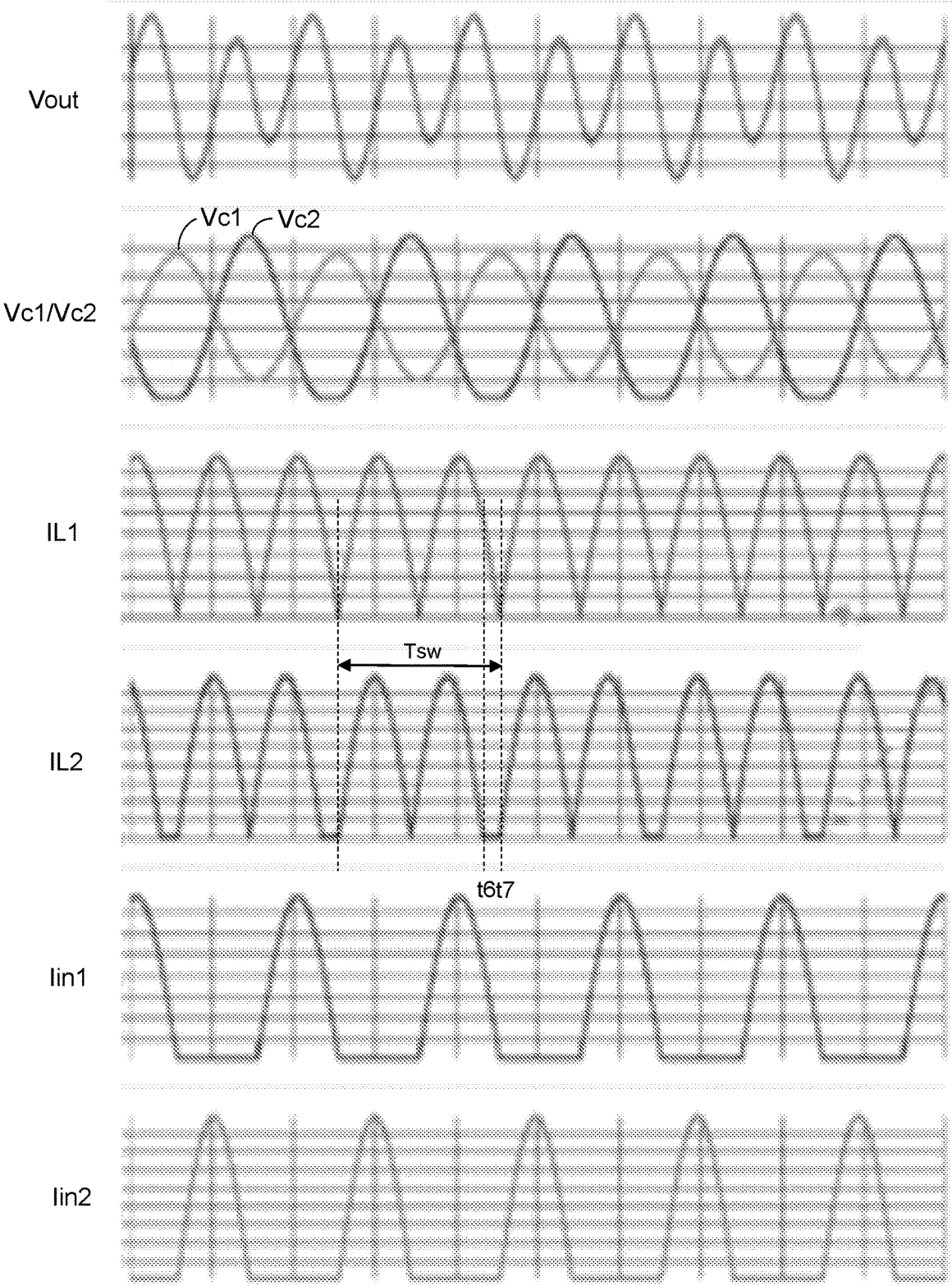
FIG. 9 illustrates a signal waveform diagram depicting another control method configured to control the operations of the RSCC 10 and RSCC 20 of FIG. 7 according to an embodiment of the present invention.

FIG. 9 illustrates a signal waveform diagram depicting another control method configured to control the operations of the RSCC 10 and RSCC 20 of FIG. 7 according to an embodiment of the present invention. Please refer to FIG. 9 along with FIG. 7 and FIG. 6. Similar to the embodiment shown in FIG. 8, this embodiment illustrates a signal waveform diagram depicting a one-cycle synchronization control method configured to control the operations of the RSCC 10 and RSCC 20 with an interleaved phase operation according to an embodiment of the present invention. This embodiment shown in FIG. 9 is different from the embodiment shown in FIG. 8, in that: in this embodiment, the RSCC 10 and the RSCC 20 have different resonant frequencies due to for example manufacture deviations of the devices in the RSCC 10 and the RSCC 20. For example, the capacitance of the resonant capacitor C1 is different from the capacitance of the resonant capacitor C2 by 20%, wherein the resonant frequency of the RSCC 20 is higher than the resonant frequency of the RSCC 10. As a result, during a resonant operation, the time point at which the second input current Iin2 reaches zero is earlier than the time point at which the first input current Iin1 reaches zero. As shown in FIG. 9, within a switching period Tsw, the second input current Iin2 reaches zero at the time point t6. In this case, the RSCC 20 will turn off switches Q1'-Q4' (wherein the switch Q1' and the switch Q2' are already in off state; the switch Q3' and the switch Q4' are turned off when the second input current Iin2 reaches zero). And, the RSCC 20 will wait for the first input current Iin1 to reach zero at the time point t7; the RSCC 10 will generate the first synchronization signal SYNCO accordingly, which will function as the second synchronization signal SYNCI' to be inputted into the RSCC 20, so that the RSCC 10 and the RSCC 20 operate synchronously to each other with a 180-degree phase-shift. Thus, according to the present invention, the synchronization operation can be achieved in the absence of a master power converter and a slave power converter.

Figure 10:
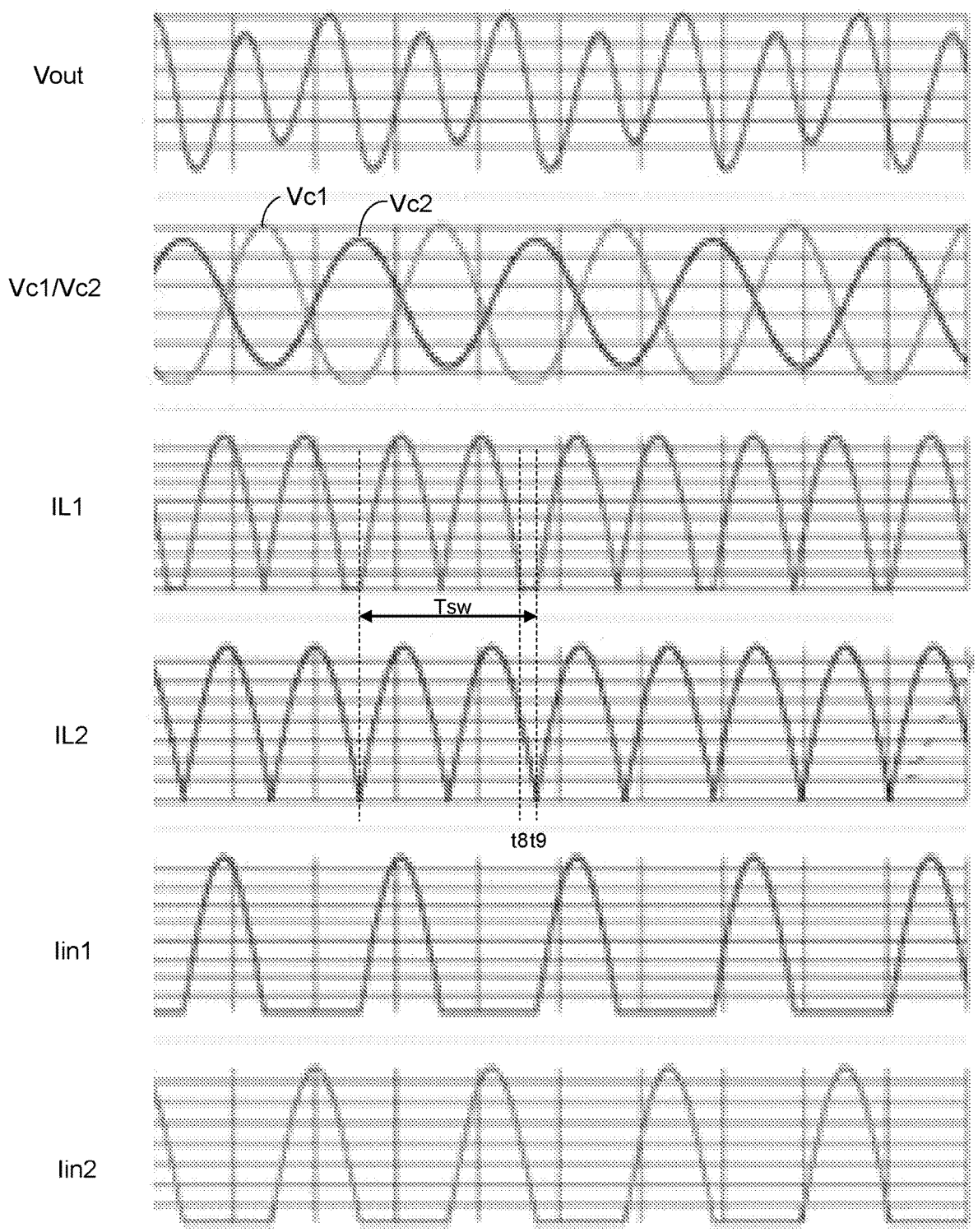
FIG. 10 illustrates a signal waveform diagram depicting yet another control method configured to control the operations of the RSCC 10 and RSCC 20 of FIG. 7 according to an embodiment of the present invention.

FIG. 10 illustrates a signal waveform diagram depicting yet another control method configured to control the operations of the RSCC 10 and RSCC 20 of FIG. 7 according to an embodiment of the present invention. Please refer to FIG. 10 along with FIG. 7 and FIG. 6. Similar to the embodiment shown in FIG. 8, this embodiment illustrates a signal waveform diagram depicting a one-cycle synchronization control method configured to control the operations of the RSCC 10 and RSCC 20 with an interleaved phase operation according to an embodiment of the present invention. This embodiment shown in FIG. 10 is different from the embodiment shown in FIG. 8, in that: in this embodiment, the RSCC 10 and the RSCC 20 have different resonant frequencies due to for example manufacture deviations of the devices in the RSCC 10 and the RSCC 20. For example, the capacitance of the resonant capacitor C1 is different from the capacitance of the resonant capacitor C2 by 20%, wherein the resonant frequency of the RSCC 10 is higher than the resonant frequency of the RSCC 20. As a result, during a resonant operation, a time point at which the first input current Iin1 reaches zero is earlier than a time point at which the second input current Iin2 reaches zero. As shown in FIG. 10, within a switching period Tsw, the first input current Iin1 reaches zero at the time point t8. In this case, the RSCC 10 will turn off switches Q1-Q4 (wherein the switch Q1 and the switch Q2 are already in off state; the switch Q3 and the switch Q4 are turned off when the first input current Iin1 reaches zero). And, the RSCC 10 will wait for the second input current Iin2 to reach zero at the time point t9. The RSCC 20 will generate the first synchronization signal SYNCO' accordingly, which will function as the second synchronization signal SYNCI to be inputted into the RSCC 10, so that the RSCC 10 and the RSCC 20 operate synchronously to each other with a 180-degree phase-shift. Thus, according to the present invention, the synchronization operation can be achieved in the absence of a master power converter and a slave power converter.

Figure 11:
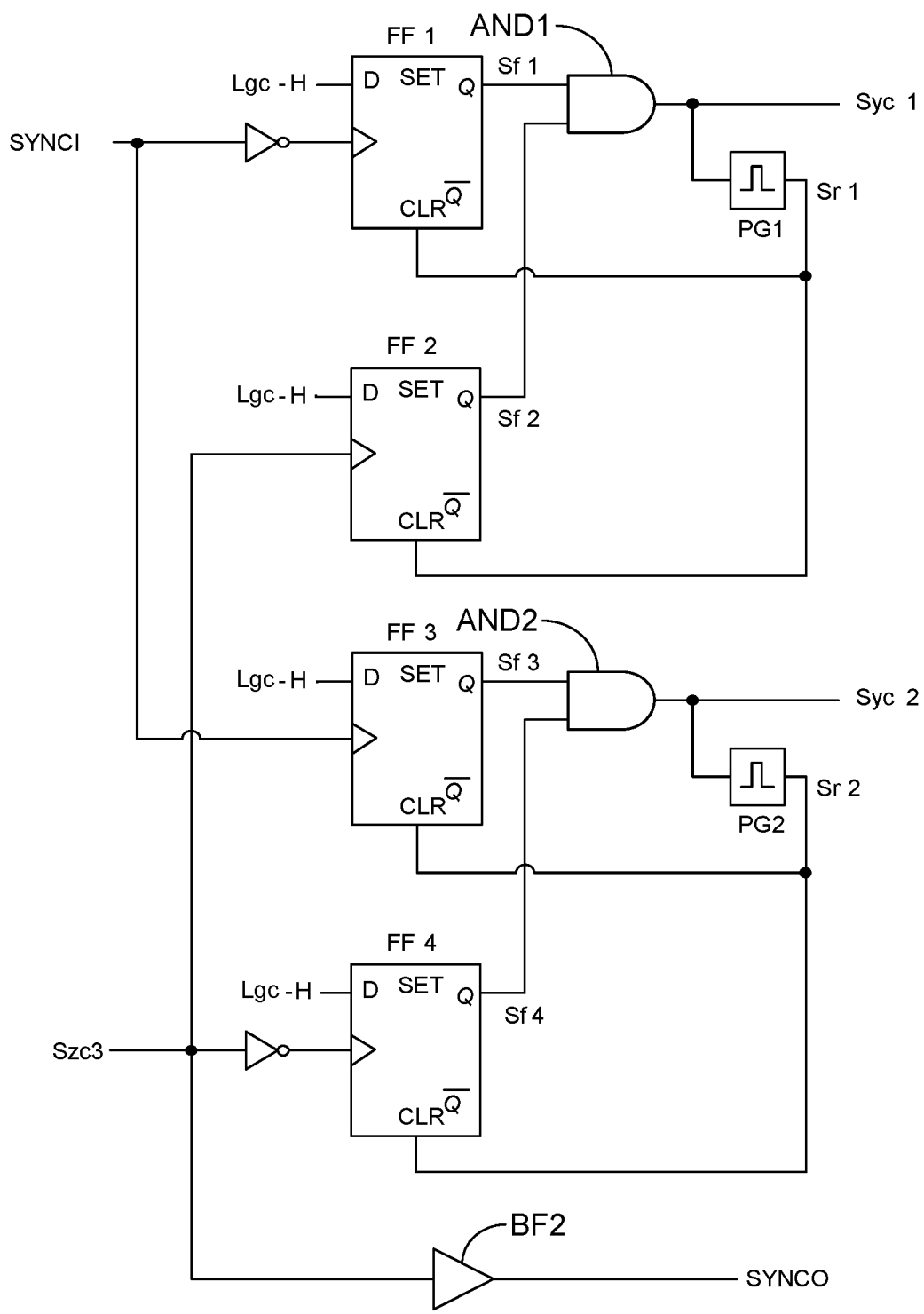
FIG. 11 shows a schematic diagram of a synchronization control circuit 1012 in an RSCC according to a specific embodiment of the present invention.

FIG. 11 shows a schematic diagram of a synchronization control circuit 1012 in an RSCC according to a specific embodiment of the present invention. Please refer to FIG. 11 along with FIG. 2, FIG. 3 and FIG. 5. The synchronization control circuit 1012 of this embodiment executes synchronization operation for the RSCC 10 and the RSCC 20 once every half-cycle. A first flip-flop FF1 generates a first output signal Sf1 according to an inverted signal of a second synchronization signal SYNCI. A second flip-flop FF2 generates a second output signal Sf2 according to a third zero current signal Szc3. A logic AND gate AND1 executes AND operation on the first output signal Sf1 and the second output signal Sf2, to generate a first synchronization control signal Syc1, wherein the first synchronization control signal Syc1 serves to enable a first switching signal generation circuit 10131 to generate the switching signal S1 and the switching signal S2 (as shown in FIG. 5). Besides, a pulse generator PG1 delays and converts the first synchronization control signal Syc1, to generate a reset signal Sr1 having a pulse, so that the reset signal Sr1 resets the first flip-flop FF1 and the second flip-flop FF2 when the first synchronization control signal Syc1 is switched to high level. A logic high level signal Lgc-H is a signal which remains at high level, and the logic high level signal Lgc-H is inputted into an input pin D of the first flip-flop FF1 and an input pin D of the second flip-flop FF2.

A third flip-flop FF3 generates a third output signal Sf3 according to the second synchronization signal SYNCI. A fourth flip-flop FF4 generates a fourth output signal Sf4 according to an inverted signal of the third zero current signal Szc3. A logic AND gate AND2 executes AND operation on the third output signal Sf3 and the fourth output signal Sf4, to generate a second synchronization control signal Syc2, wherein the second synchronization control signal Syc2 serves to enable a second switching signal generation circuit 10132 to generate the switching signal S3 and the switching signal S4 (as shown in FIG. 5). Besides, a pulse generator PG2 delays and converts the second synchronization control signal Syc2, to generate a reset signal Sr2 having a pulse, so that the reset signal Sr2 resets the third flip-flop FF3 and the fourth flip-flop FF4 when the second synchronization control signal Syc2 is switched to high level. A buffer BF2 generates a first synchronization signal SYNCO based upon the third zero current signal Szc3, wherein the first synchronization signal SYNCO serves to synchronize another RSCC which is phase-shifted by 180-degree. The logic high level signal Lgc-H is a signal which remains at high level, and the logic high level signal Lgc-H is inputted into an input pin D of the third flip-flop FF3 and an input pin D of the fourth flip-flop FF4. The third zero current signal Szc3 indicates a time point at which a resonant capacitor current is zero within a switching period. For example, at the beginning time point of the switching period, the third zero current signal Szc3 is at high level. Subsequently, when the resonant capacitor current is zero for a first time (i.e., at the 180-degree phase) during the switching period, the third zero current signal Szc3 is switched to low level. Subsequently, when the resonant capacitor current is zero at the 360-degree phase during the switching period, the third zero current signal Szc3 is switched to high level.

Figure 12:
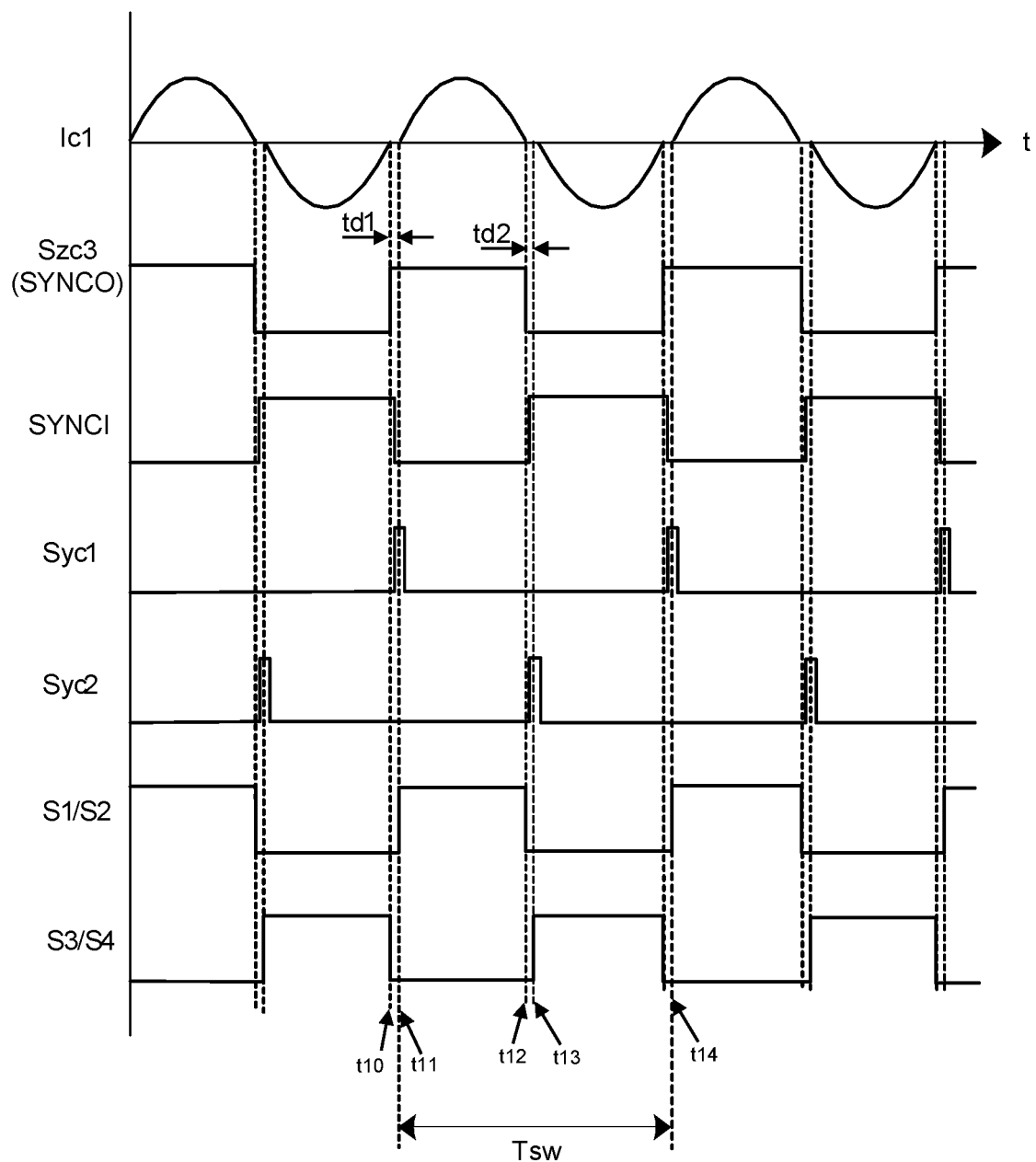
FIG. 12 illustrates a signal waveform diagram depicting a half-cycle RSCC synchronization control method configured to control the operations of the RSCC 10 and RSCC 20 with an inphase operation or a 180-degree phase-shift synchronization operation according to an embodiment of the present invention, wherein only the signals relevant to the operation of the RSCC 10 are illustrated.

FIG. 12 illustrates a signal waveform diagram depicting a half-cycle RSCC synchronization control method configured to control the operations of the RSCC 10 and RSCC 20 with an inphase operation or a 180-degree phase-shift synchronization operation according to an embodiment of the present invention, wherein only the signals relevant to the operation of the RSCC 10 are illustrated. For example, as compared to the RSCC 20 which provides a second synchronization signal SYNCI, the RSCC 10 has a relatively higher resonant frequency. As a consequence, a rising edge and a falling edge of the third zero current signal Szc3 are respectively earlier than a falling edge and a rising edge of the second synchronization signal SYNCI. In this embodiment, the RSCC 10 and the RSCC 20 are synchronized with each other once every half cycle of the switching period Tsw. The third zero current signal Szc3 serves to function as the first synchronization signal SYNCO, which is inputted into the RSCC 20.

In this case, in the embodiment shown in FIG. 12, when the resonant capacitor current IC1 flowing through the resonant capacitor C1 is zero at the time point t10, the third zero current signal Szc3 is switched from low level to high level. And, the control circuit 101 switches the switching signal S3 and the switching signal S4 from high level to low level according to the third zero current signal Szc3, so as to turn off the switch Q3 and the switch Q4, wherein at the time point t10, the second synchronization signal SYNCI has not yet switched its level (i.e., a rising edge of the second synchronization signal SYNCI has not yet been generated), so the switch Q1, the switch Q2, the switch Q3 and the switch Q4 in the RSCC 10 are in turned-off state, waiting to be synchronized with the RSCC 20. There is a dead time period td1 from a switching time point of the third zero current signal Szc3 (i.e., a time point at which the rising edge of third zero current signal Szc3 appears) to a time point at which the switching signal S1 and the switching signal S2 are switched from low level to high level, that is, the period from the time point t10 to the time point t1/ in FIG. 12.

Within the dead time period td1 from the time point t10 to the time point t1/, the second synchronization signal SYNCI from the RSCC 20 is switched to low level (i.e., a falling edge of the second synchronization signal SYNCI from the RSCC 20 appears). The control circuit 101 generates the first synchronization control signal Syc1 according to the third zero current signal Szc3 and the second synchronization signal SYNCI, so as to switch the switching signal S1 and the switching signal S2 from low level to high level, thus turning on the switch Q1 and the switch Q2, so that the RSCC 10 operates in synchronization with the RSCC 20.

When the resonant capacitor current IC1 flowing through the resonant capacitor C1 is zero once again at the time point t12, the third zero current signal Szc3 is switched from high level to low level. And, the control circuit 101 switches the switching signal S1 and the switching signal S2 from high level to low level, so as to turn off the switch Q1 and the switch Q2, wherein at the time point t12, the second synchronization signal SYNCI has not yet switched its level (i.e., a rising edge of the second synchronization signal SYNCI has not yet been generated), so the switch Q1, the switch Q2, the switch Q3 and the switch Q4 in the RSCC 10 are in turned-off state, waiting to be synchronized with the RSCC 20. Besides, the control circuit 101 adopts the third zero current signal Szc3 to function as the first synchronization signal SYNCO, and inputs such first synchronization signal SYNCO into the RSCC 20, so that the RSCC 10 and the RSCC 20 operate synchronously to each other. Within a period from the time point t12 to the time point t13 in FIG. 12, the second synchronization signal SYNCI is switched from low level to high level (i.e., a rising edge of the second synchronization signal SYNCI is generated), and the control circuit 101 generates the second synchronization control signal Syc2 according to the third zero current signal Szc3 and the second synchronization signal SYNCI, so as to switch the switching signal S3 and the switching signal S4 from low level to high level at the time point t13, to turn on the switch Q3 and the switch Q4, so that the RSCC 10 and the RSCC 20 operate synchronously to each other. There is a second dead time period td2 from the time point t12 to the time point t13 in FIG. 12.

When the resonant capacitor current IC1 flowing through the resonant capacitor C1 is zero once again within the switching period Tsw, the aforementioned operations at the time point t10 is once again repeatedly executed. That is, at the time point t14, the switching signal S1 and the switching signal S2 are switched from low level to high level, to turn on the switch Q1 and the switch Q2. The time period from the time point t1/ to the time point t14 in FIG. 12 is defined as a switching period Tsw. In this embodiment, every time when the RSCC 10 having a relatively higher resonant frequency as compared to the RSCC 20 has operated for a half switching period Tsw, the RSCC 10 will wait for the resonant capacitor current IC1 of the RSCC 20 to reach zero current, and then starts the next half cycle in synchronization with the RSCC 20, so that the RSCC 10 operates in synchronization with the RSCC 20 with an inphase operation or a 180-degree phase-shift in every half-cycle.

Figure 13:
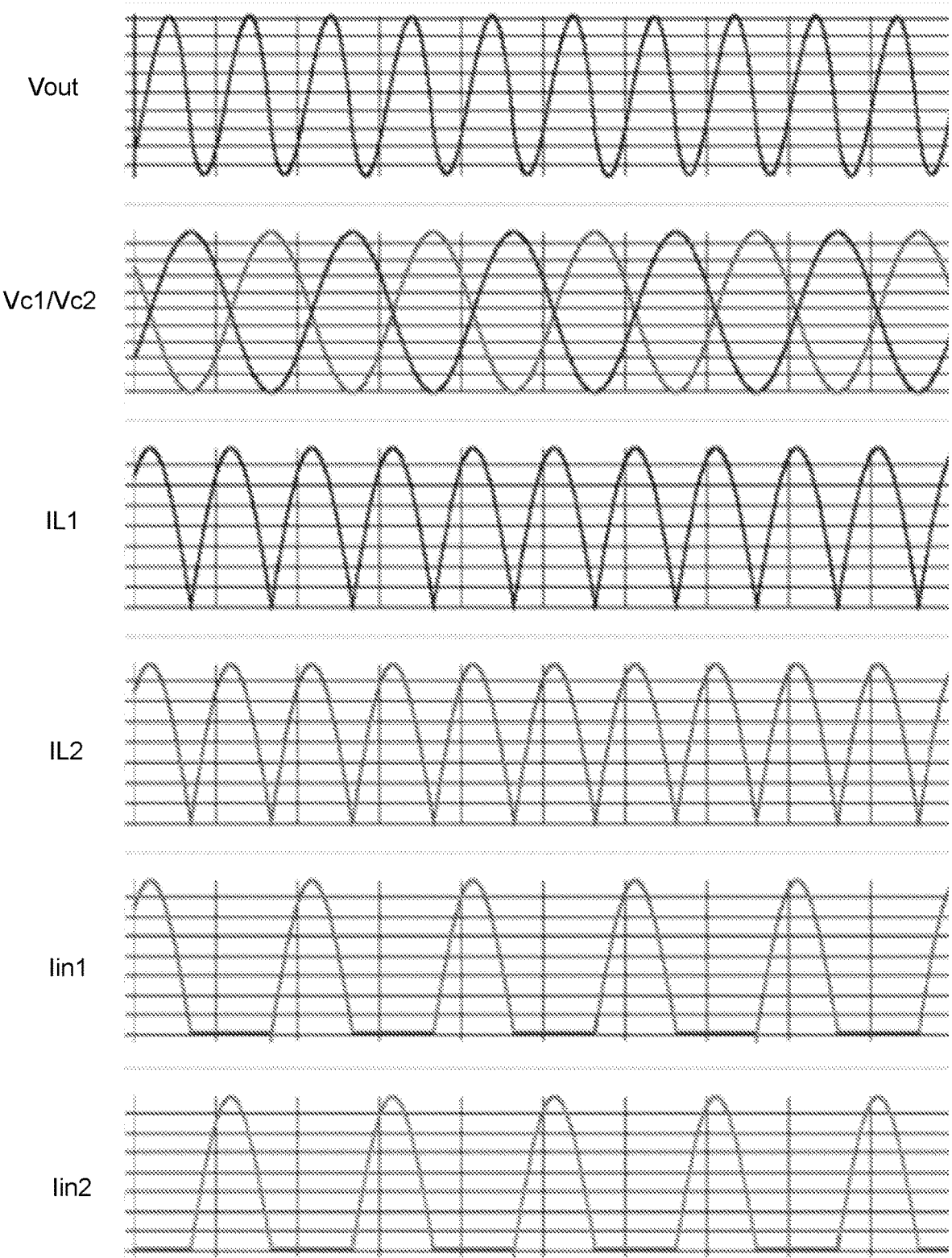
FIG. 13 illustrates a signal waveform diagram depicting a control method configured to control the operations of the RSCC 10 and RSCC 20 of FIG. 7 according to an embodiment of the present invention.

FIG. 13 illustrates a signal waveform diagram depicting a control method configured to control the operations of the RSCC 10 and RSCC 20 of FIG. 7 according to an embodiment of the present invention. Please refer to FIG. 13 along with FIG. 7 and FIG. 12. This embodiment illustrates a signal waveform diagram depicting a half-cycle synchronization control method configured to control the operations of the RSCC 10 and RSCC 20 with an interleaved phase operation according to an embodiment of the present invention. In this embodiment, the RSCC 10 and the RSCC 20 have for example a same resonant frequency, and during resonant operation, an amplitude of the resonant capacitor voltage Vc1 is the same as an amplitude of the resonant capacitor voltage Vc2, and the resonant capacitor voltage Vc1 and the resonant capacitor voltage Vc2 are phase-shifted by 180° from each other. It can be seen from the waveforms of the first input current Iin1 and the second input current Iin2 that the first input current Iin1 and the second input current Iin2 are phase-shifted by 180° from each other, to provide currents in an alternating fashion. During the resonant operation of the RSCC 10, due to the operations of the switch Q1, the switch Q2, the switch Q3 and the switch Q4 in the switching circuit, in a charging process and a discharging process on the resonant capacitor C1, the waveform of the resonant inductor current IL1 is a full-wave rectified sinusoidal waveform. Similarly, during the resonant operation of the RSCC 20, due to the operations of the switch Q1', the switch Q2', the switch Q3' and the switch Q4' in the switching circuit, in a charging process and a discharging process on the resonant capacitor C2, the waveform of the resonant inductor current IL2 is a full-wave rectified sinusoidal waveform. Each of the resonant inductor current IL1 and the resonant inductor current IL2 has a frequency which is 2-fold of a switching frequency corresponding to the switching period Tsw. As a consequence, the output voltage Vout has a frequency which is 2-fold of the switching frequency.

Figure 14:
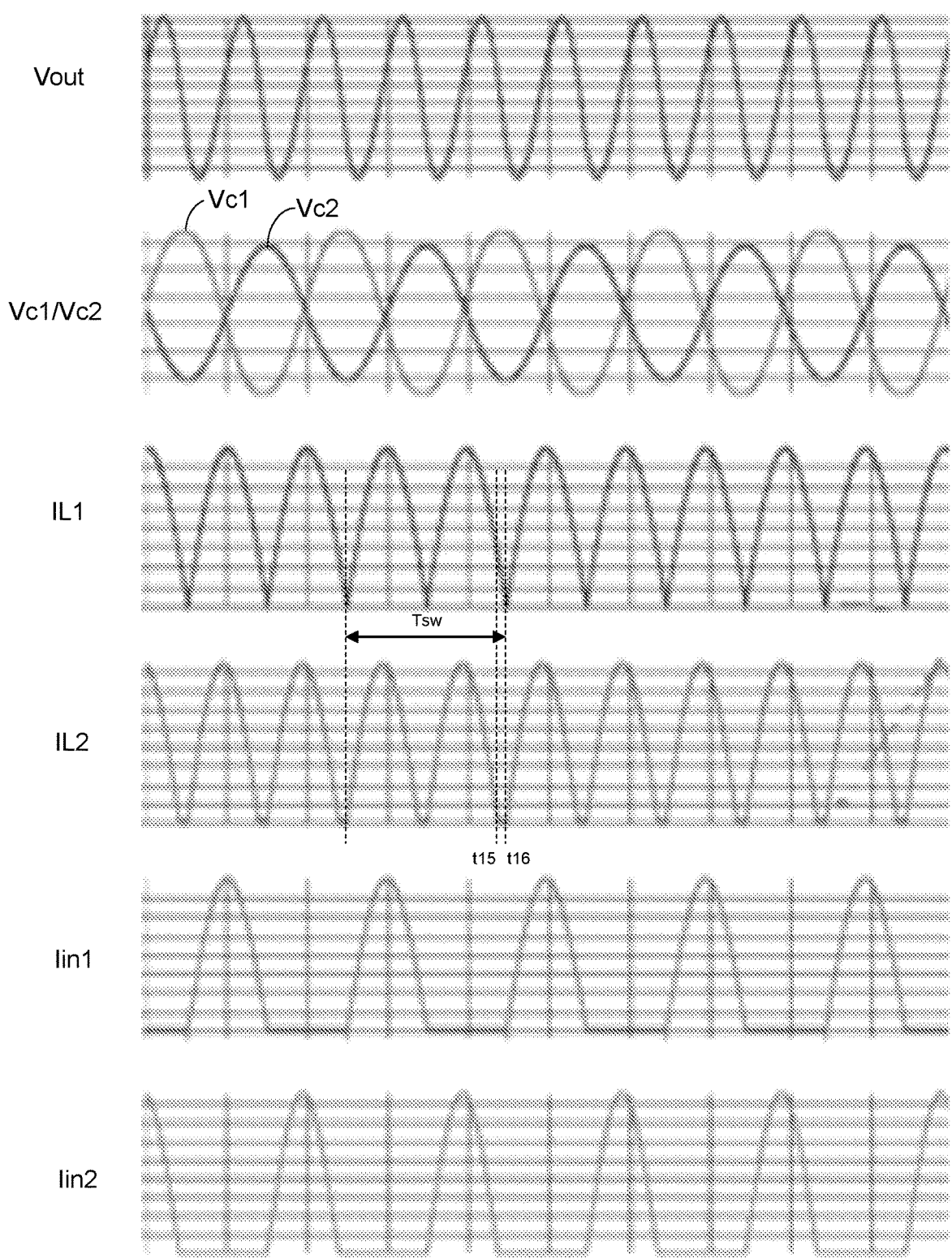
FIG. 14 illustrates a signal waveform diagram depicting another control method configured to control the operations of the RSCC 10 and RSCC 20 of FIG. 7 according to an embodiment of the present invention.

FIG. 14 illustrates a signal waveform diagram depicting another control method configured to control the operations of the RSCC 10 and RSCC 20 of FIG. 7 according to an embodiment of the present invention. Please refer to FIG. 14 along with FIG. 7 and FIG. 12. Similar to the embodiment shown in FIG. 13, this embodiment illustrates a signal waveform diagram depicting a half-cycle synchronization control method configured to control the operations of the RSCC 10 and RSCC 20 with an interleaved phase operation according to an embodiment of the present invention. This embodiment shown in FIG. 14 is different from the embodiment shown in FIG. 13, in that: in this embodiment, the RSCC 10 and the RSCC 20 have different resonant frequencies due to for example manufacture deviations of the devices in the RSCC 10 and the RSCC 20. For example, the capacitance of the resonant capacitor C1 is different from the capacitance of the resonant capacitor C2 by 20%, wherein the resonant frequency of the RSCC 20 is higher than the resonant frequency of the RSCC 10. In this case, during resonant operation, the time point at which the second input current Iin2 reaches zero is earlier than the time point at which the first input current Iin1 reaches zero. As shown in FIG. 14, within a switching period Tsw, the second input current Iin2 reaches zero at the time point t15. In this case, the RSCC 20 will turn off switches Q1'-Q4' (wherein the switch Q1' and the switch Q2' are already in off state; the switch Q3' and the switch Q4' are turned off when the second input current Iin2 reaches zero). And, the RSCC 20 will wait for the first input current Iin1 to reach zero at the time point t16. The RSCC 10 will generate the first synchronization signal SYNCO, which functions as the second synchronization signal SYNCI' to be inputted into the RSCC 20, so that the RSCC 10 and the RSCC 20 operate synchronously to each other with a 180-degree phase-shift. According to the present invention, the synchronization operation is achieved in the absence of a master power converter and a slave power converter.

Figure 15:
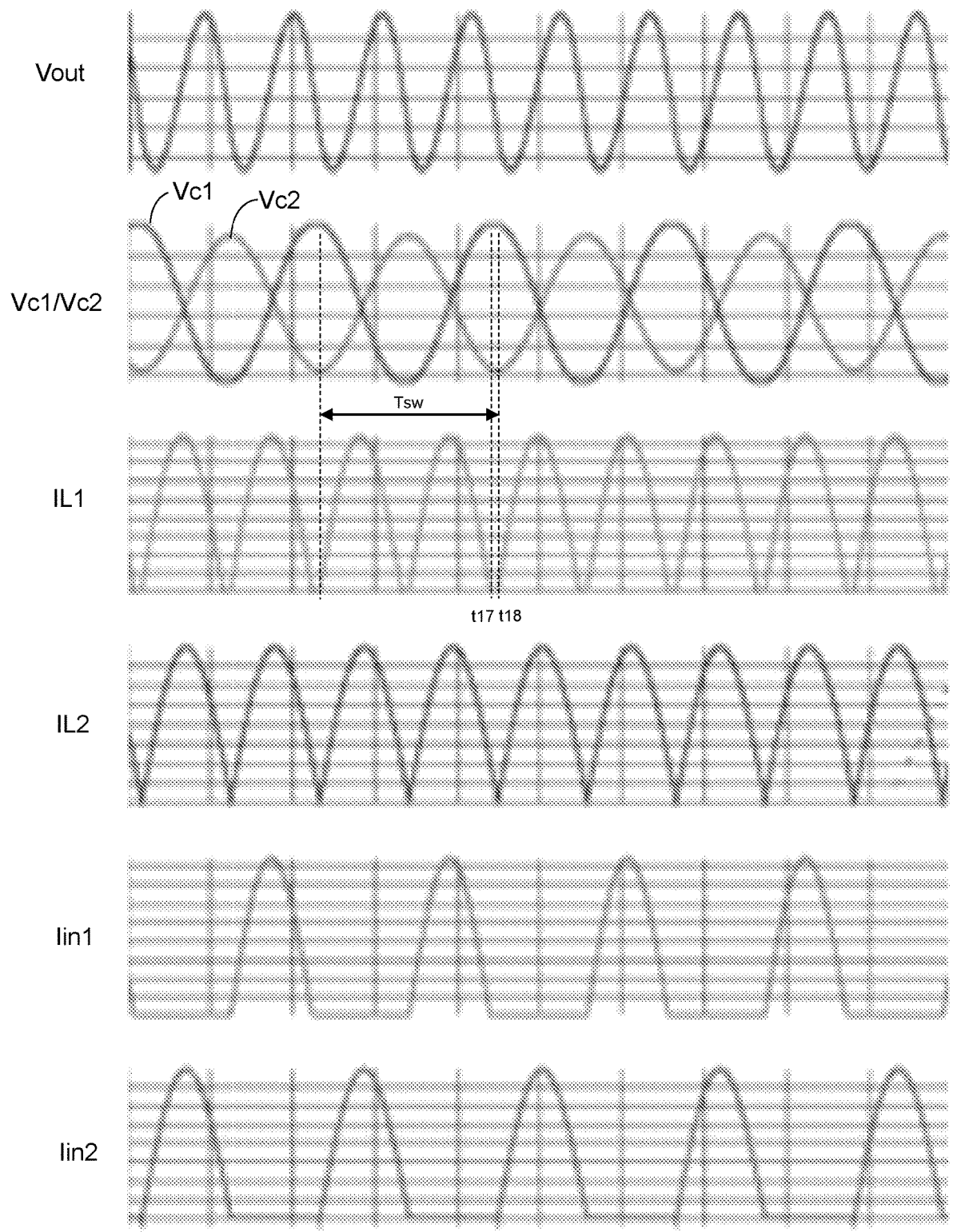
FIG. 15 illustrates a signal waveform diagram depicting yet another control method configured to control the operations of the RSCC 10 and RSCC 20 of FIG. 7 according to an embodiment of the present invention.

FIG. 15 illustrates a signal waveform diagram depicting yet another control method configured to control the operations of the RSCC 10 and RSCC 20 of FIG. 7 according to an embodiment of the present invention. Please refer to FIG. 15 along with FIG. 7 and FIG. 6. Similar to the embodiment shown in FIG. 13, this embodiment illustrates a signal waveform diagram depicting a half-cycle synchronization control method configured to control the operations of the RSCC 10 and RSCC 20 with an interleaved phase operation according to an embodiment of the present invention. This embodiment shown in FIG. 15 is different from the embodiment shown in FIG. 13, in that: in this embodiment, the RSCC 10 and the RSCC 20 have different resonant frequencies due to for example manufacture deviations of the devices in the RSCC 10 and the RSCC 20. For example, the capacitance of the resonant capacitor C1 is different from the capacitance of the resonant capacitor C2 by 20%, wherein the resonant frequency of the RSCC 10 is higher than the resonant frequency of the RSCC 20. In this case, during the resonant operation, the time point at which the first input current Iin1 reaches zero is earlier than the time point at which the second input current Iin2 reaches zero. As shown in FIG. 15, within the switching period Tsw, the first input current Iin1 reaches zero at the time point t17. In this case, the RSCC 10 will turn off the switches Q1-Q4 (wherein the switch Q1 and the switch Q2 are already in off state; the switch Q3 and the switch Q4 are turned off when the first input current Iin1 reaches zero). And, the RSCC 10 will wait for the second input current Iin2 to reach zero at the time point t18. The RSCC 20 will generate the first synchronization signal SYNCO', which functions as the second synchronization signal SYNCI to be inputted into the RSCC 10, so that the RSCC 10 and the RSCC 20 operate synchronously to each other with the 180-degree phase-shift. According to the present invention, the synchronization operation is achieved in the absence of a master power converter and a slave power converter.

Figure 16:
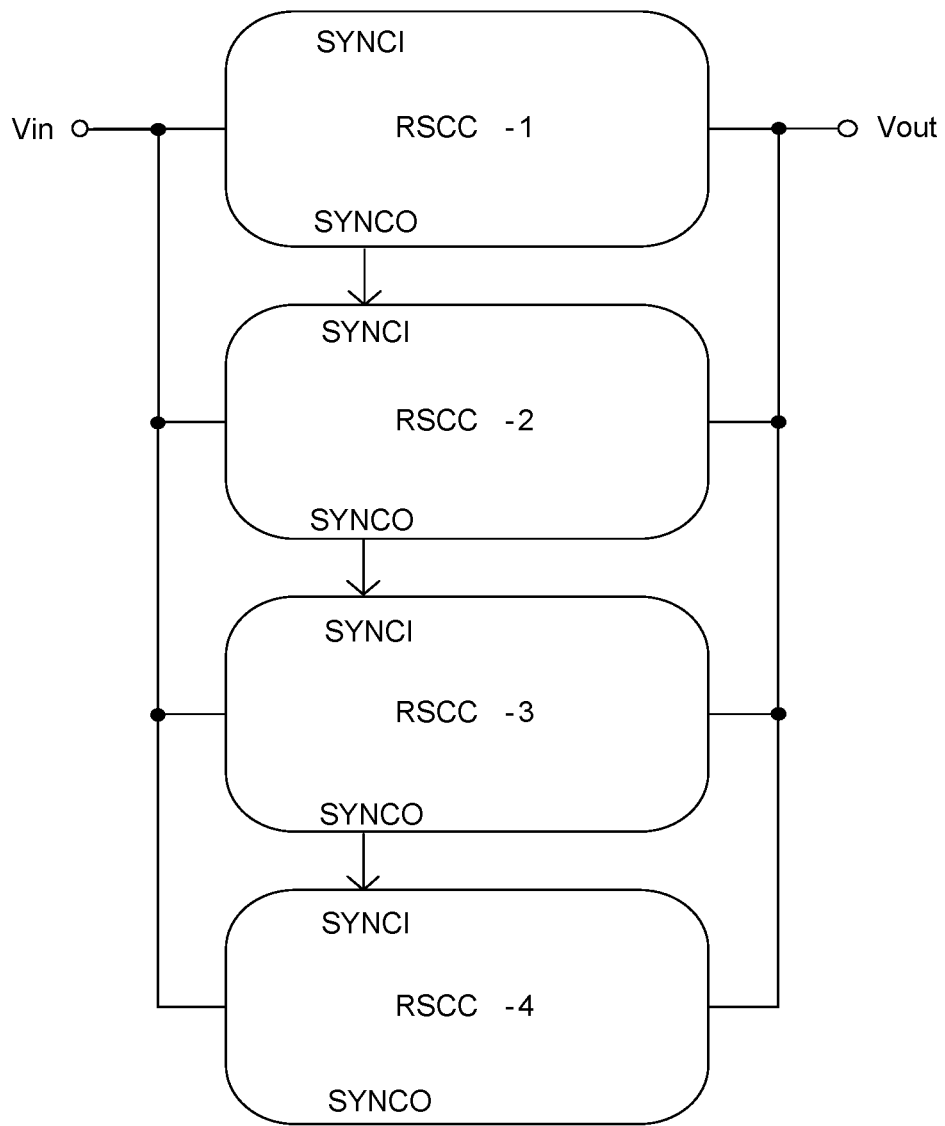
FIG. 16 shows a schematic diagram depicting a configuration wherein several RSCCs are coupled in parallel among one another according to an embodiment of the present invention.

FIG. 16 shows a schematic diagram depicting a configuration wherein several RSCCs are coupled in parallel among one another according to an embodiment of the present invention. As shown in FIG. 16, several RSCCs RSCC-1, RSCC-2, RSCC-3 and RSCC-4 are coupled in parallel among one another, to broaden a power delivery scope between an input and an output. According to the present invention, these RSCCs RSCC-1, RSCC-2, RSCC-3 and RSCC-4 can operate synchronously among one another with a predetermined phase-shift. The first synchronization signal SYNCO of each of the RSCCs RSCC-1, RSCC-2, RSCC-3 and RSCC-4 can function as the second synchronization signal SYNCI of another one of the RSCCs RSCC-1, RSCC-2, RSCC-3 and RSCC-4. The parallel connection and the phase-shift degree can have multiple combinations. For example, four RSCCs RSCC-1, RSCC-2, RSCC-3 and RSCC-4 coupled in parallel can operate in synchronization with one another by a 90-degree phase-shift in a sequential fashion. For another example, three of the four RSCCs RSCC-1, RSCC-2, RSCC-3 and RSCC-4 can be coupled in parallel to operate in synchronization with one another by a 120-degree phase-shift. According to the present invention, a peak value of a total input current of these RSCCs RSCC-1, RSCC-2, RSCC-3 and RSCC-4 can be reduced, to alleviate impact on the input capacitor and/or the input power supply.

Figure 17:
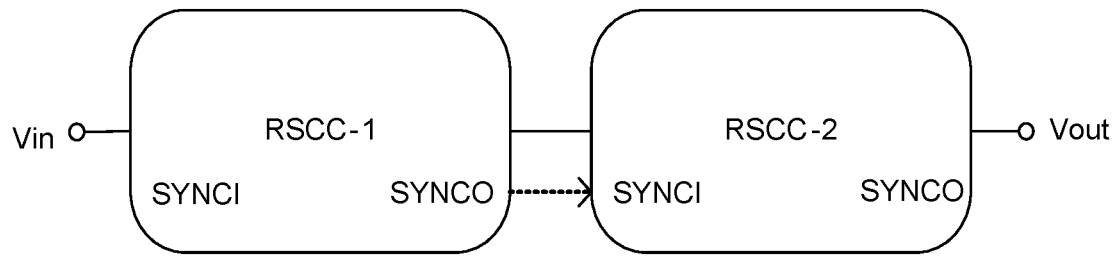
FIG. 17 shows a schematic circuit diagram depicting a configuration wherein two RSCCs are coupled in series to each other according to an embodiment of the present invention.

FIG. 17 shows a schematic circuit diagram depicting a configuration wherein two RSCCs are coupled in series to each other according to an embodiment of the present invention. The two RSCCs RSCC-1 and RSCC-2 coupled in series to each other serve to increase a voltage conversion ratio scope between an input voltage Vin and an output voltage Vout. According to the present invention, the two RSCCs RSCC-1 and RSCC-2 coupled in series to each other and operate in synchronization with a predetermined phase-shift can improve the EMI performance.

FIG. 18 to FIG. 22 show schematic circuit diagrams of an RSCC according to several embodiments of the present invention. According to the present invention, the RSCC can be implemented in different ways, as shown in FIG. 18 to FIG. 22.

Figure 18:
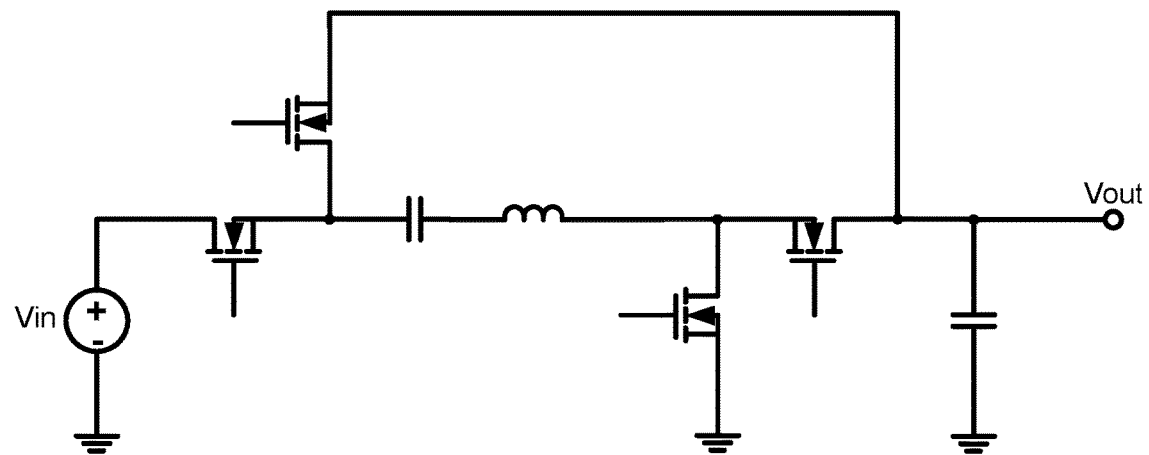
FIG. 18 to FIG. 22 show schematic circuit diagrams of an RSCC according to several embodiments of the present invention.
Figure 19:
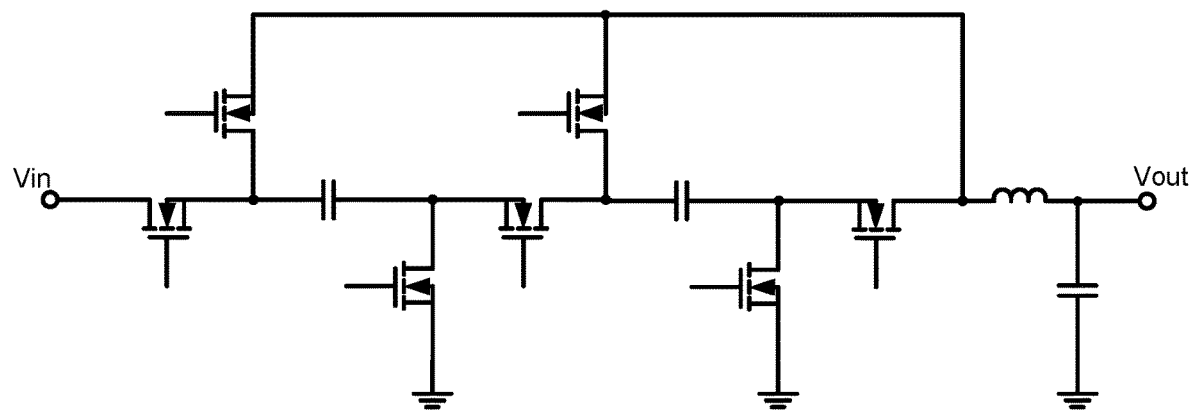
Figure 20:
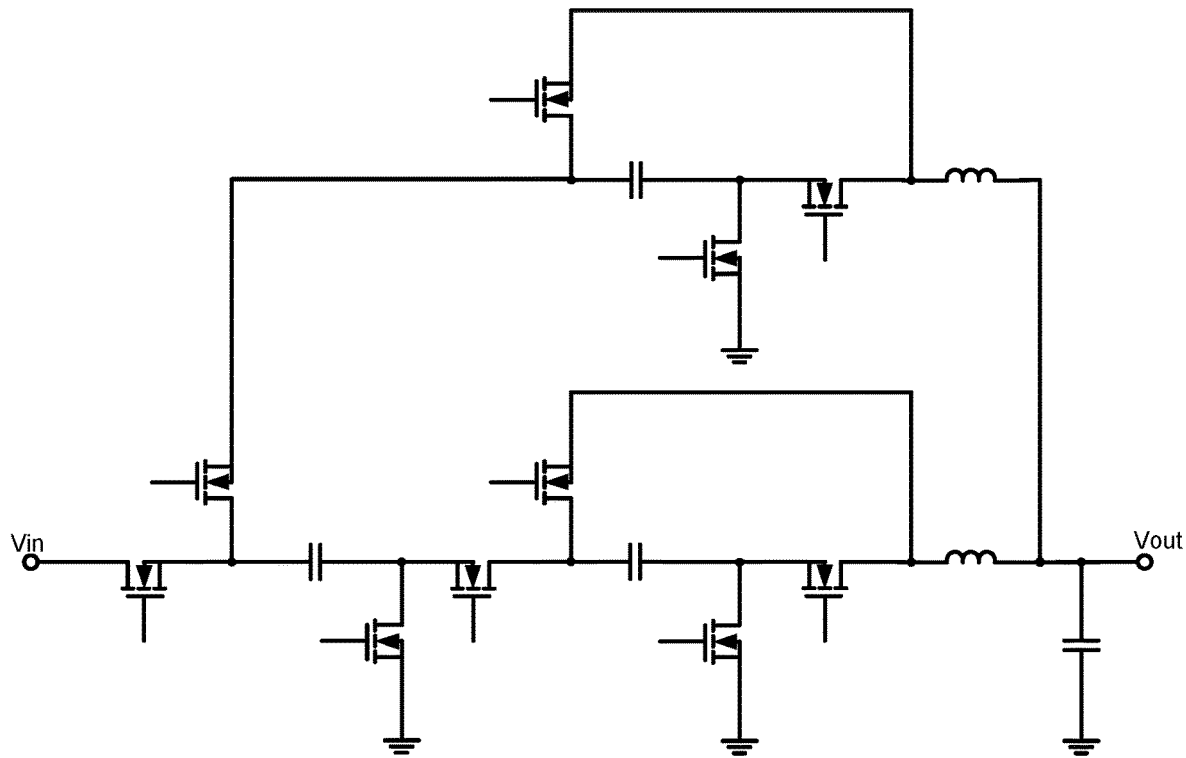
Figure 21:
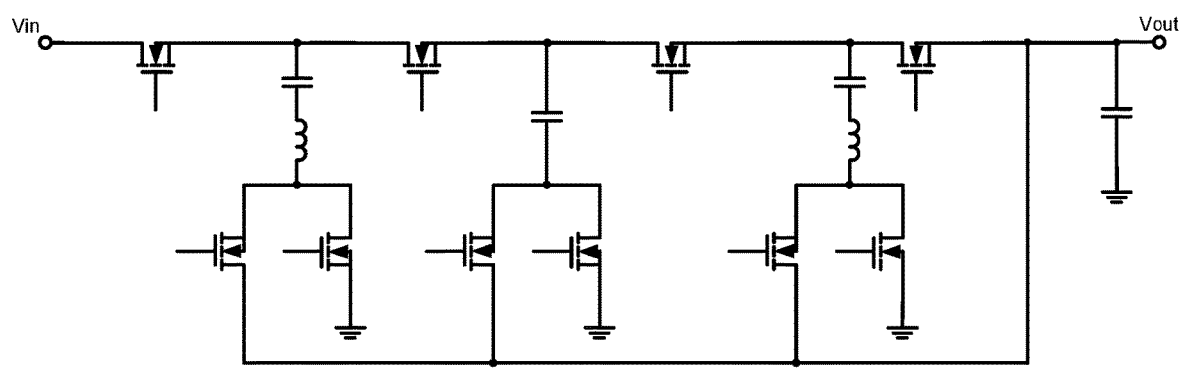
Figure 22:
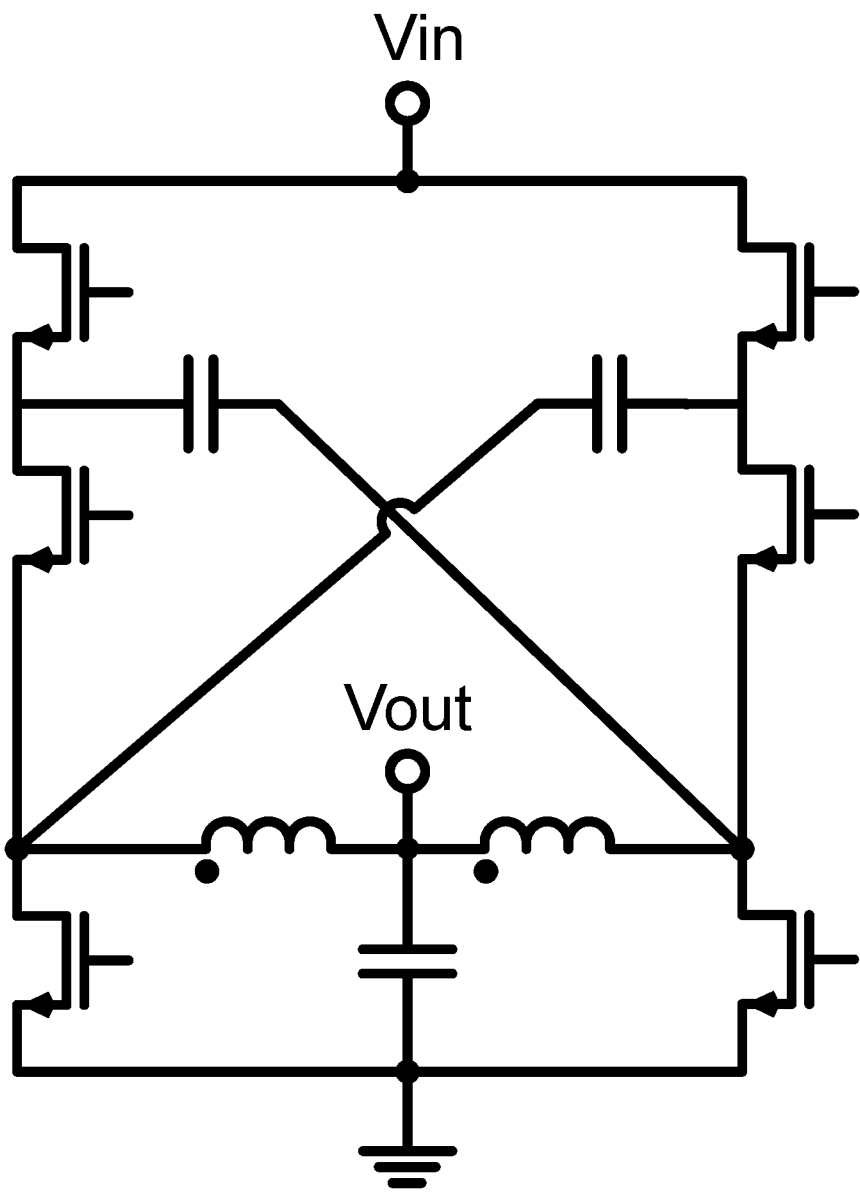

FIG. 18 shows a schematic diagram of an RSCC according to the present invention, wherein the RSCC is implemented as a 2-to-1 RSCC. FIG. 19 shows a schematic diagram of an RSCC according to the present invention, wherein the RSCC is implemented as a series-parallel RSCC. FIG. 20 shows a schematic diagram of an RSCC according to the present invention, wherein the RSCC is implemented as a pipelined RSCC. FIG. 21 shows a schematic diagram of an RSCC according to the present invention, wherein the RSCC is implemented as a switched tank converter. FIG. 22 shows a schematic diagram of an RSCC according to the present invention, wherein the RSCC is implemented as a cross coupled switched-capacitor converter.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant switched capacitor voltage converter (first RSCC), which is configured to be coupled to at least another RSCC (second RSCC) and operate in synchronization with the second RSCC, to convert an input voltage to an output voltage; the first RSCC comprising:
   a plurality of switches, which constitute a switching circuit, wherein the switching circuit is configured to operably receive the input voltage;
   a resonant inductor, which is coupled to the switching circuit;
   a resonant capacitor, which is coupled to the switching circuit; and
   a control circuit, which is configured to operably generate a plurality of switching signals, to correspondingly control the plurality of switches in the switching circuit, so that the resonant capacitor and the resonant inductor are connected in series to each other, to perform resonant operation during a switching period, thus converting the input voltage to the output voltage;
   wherein the control circuit is configured to operably generate a zero current signal and a first synchronization signal when a resonant inductor current flowing through the resonant inductor is zero;
   wherein the control circuit is configured to operably turn off at least one corresponding switch according to the zero current signal;
   wherein the first synchronization signal is configured to be inputted into the second RSCC;
   wherein the control circuit is configured to operably turn on the at least one corresponding switch according to the zero current signal and a second synchronization signal, so that the first RSCC operates in synchronization with the second RSCC.

2. The first RSCC of claim 1, wherein the control circuit is configured to operably generate the first synchronization signal according to the zero current signal during the switching period or a half switching period, so that the first RSCC operates in synchronization with the second RSCC.

3. The first RSCC of claim 1, wherein the second synchronization signal is generated by the second RSCC, so that the second RSCC operates in synchronization with the first RSCC.

4. The first RSCC of claim 3, wherein the second RSCC operates in synchronization with the first RSCC with a 180-degree phase-shift according to the first synchronization signal and the second synchronization signal.

5. The first RSCC of claim 1, wherein the control circuit is configured to operably turn on the at least one corresponding switch according to the zero current signal and the second synchronization signal which is generated by the second RSCC, so that the first RSCC operates in synchronization with the second RSCC with a predetermined phase-shift.

6. The first RSCC of claim 1, wherein the control circuit is configured to operably generate the plurality of switching signals according to a resonant frequency of a resonant operation, wherein the control circuit decides a turned-off period of the corresponding switch according to the resonant frequency, so that the first RSCC operates in synchronization with the second RSCC.

7. The first RSCC of claim 1, wherein the control circuit is configured to operably generate the switching signal according to the zero current signal, so as to operate the at least one corresponding switch, thus achieving a zero current switching;
wherein the control circuit is configured to operably generate the zero current signal according to a voltage across two ends of the resonant inductor or the resonant inductor current.

8. The first RSCC of claim 1, wherein the first RSCC is coupled in parallel to the second RSCC and the first RSCC operates in synchronization with the second RSCC to broaden an output current scope.

9. The first RSCC of claim 1, wherein the first RSCC is coupled in series to the second RSCC and the first RSCC operates in synchronization with the second RSCC, so as to increase a voltage conversion ratio scope.

10. The first RSCC of claim 1, wherein the first RSCC includes one of following: a 2-to-1 RSCC, a series-parallel RSCC, a pipelined RSCC, a switched tank converter or a cross coupled switched-capacitor converter.

11. A control method of a resonant switched capacitor voltage converter (first RSCC), wherein the first RSCC is configured to be coupled to at least another RSCC (second RSCC) and operate in synchronization with the second RSCC, to convert an input voltage to an output voltage; the control method of the first RSCC comprising following steps:
generating a plurality of switching signals to operably control the plurality of switches, so that a resonant capacitor and a resonant inductor are connected in series to each other, to perform resonant operation during a switching period, thus converting the input voltage to the output voltage;
generating a zero current signal and a first synchronization signal when a resonant inductor current flowing through the resonant inductor is zero;
turning off at least one corresponding switch according to the zero current signal; and
turning on the at least one corresponding switch according to the zero current signal and a second synchronization signal, so that the first RSCC operates in synchronization with the second RSCC;
wherein the first synchronization signal is configured to be inputted into the second RSCC.

12. The control method of the RSCC of claim 11, wherein the step of generating the zero current signal and the first synchronization signal when the resonant inductor current flowing through the resonant inductor is zero includes:
generating the first synchronization signal according to the zero current signal during the switching period or a half switching period, so that the first RSCC operates in synchronization with the second RSCC.

13. The control method of the RSCC of claim 11, wherein the second synchronization signal is generated by the second RSCC, so that the second RSCC operates in synchronization with the first RSCC.

14. The control method of the RSCC of claim 11, further comprising:
operating the first RSCC and the second RSCC in synchronization with a 180-degree phase-shift according to the first synchronization signal and the second synchronization signal.

15. The control method of the RSCC of claim 11, further comprising:
turning on the at least one corresponding switch according to the zero current signal and the second synchronization signal which is generated by the second RSCC, so that the first RSCC operates in synchronization with the second RSCC with a predetermined phase-shift.

16. The control method of the RSCC of claim 11, further comprising:
generating the plurality of switching signals according to a resonant frequency of a resonant operation and deciding a turned-off period of the corresponding switch according to the resonant frequency, so that the first RSCC operates in synchronization with the second RSCC.

17. The control method of the RSCC of claim 11, wherein the step of turning on the at least one corresponding switch includes:
generating the zero current signal according to a voltage across two ends of the resonant inductor or the resonant inductor current and generating the switching signal according to the zero current signal, so as to operate the at least one corresponding switch, thus achieving a zero current switching.

18. The control method of the RSCC of claim 11, wherein the first RSCC is coupled in parallel to the second RSCC and operates in synchronization with the second RSCC, so as to broaden an output current scope.

19. The control method of the RSCC of claim 11, wherein the RSCC is coupled in series to the second RSCC and operates in synchronization with the second RSCC, so as to increase a voltage conversion ratio scope.

20. The control method of the RSCC of claim 11, wherein the RSCC includes one of following: a 2-to-1 RSCC, a series-parallel RSCC, a pipelined RSCC, a switched tank converter or a cross coupled switched-capacitor converter.

* * * * *